(12) United States Patent
Inomoto

(10) Patent No.: US 8,928,992 B2
(45) Date of Patent: Jan. 6, 2015

(54) ZOOM LENS AND IMAGE PICKUP APPARATUS INCLUDING THE SAME

(71) Applicant: Canon Kabushiki Kaisha, Tokyo (JP)

(72) Inventor: Yu Inomoto, Saitama (JP)

(73) Assignee: Canon Kabushiki Kaisha (JP)

(*) Notice: Subject to any disclaimer, the term of this patent is extended or adjusted under 35 U.S.C. 154(b) by 61 days.

(21) Appl. No.: 13/861,758

(22) Filed: Apr. 12, 2013

(65) Prior Publication Data

US 2013/0271643 A1 Oct. 17, 2013

(30) Foreign Application Priority Data

Apr. 13, 2012 (JP) .................................. 2012-091814

(51) Int. Cl.
*G02B 15/14* (2006.01)

(52) U.S. Cl.
USPC ........... 359/686; 359/683; 359/684; 359/685; 359/687; 359/715; 359/740; 359/774

(58) Field of Classification Search
USPC .......................... 359/683–687, 715, 740, 774
See application file for complete search history.

(56) References Cited

U.S. PATENT DOCUMENTS

| | | | | |
|---|---|---|---|---|
| 6,028,715 A | * | 2/2000 | Takamoto et al. | 359/688 |
| 6,342,974 B1 | * | 1/2002 | Usui | 359/687 |
| 7,903,345 B2 | * | 3/2011 | Nurishi | 359/687 |
| 8,570,662 B2 | * | 10/2013 | Eguchi et al. | 359/684 |
| 8,659,832 B2 | * | 2/2014 | Takemoto et al. | 359/687 |
| 2011/0080647 A1 | * | 4/2011 | Sugita et al. | 359/675 |
| 2011/0279898 A1 | * | 11/2011 | Takemoto et al. | 359/557 |

FOREIGN PATENT DOCUMENTS

JP 2001-356381 A 12/2001

* cited by examiner

*Primary Examiner* — Evelyn A. Lester
(74) *Attorney, Agent, or Firm* — Rossi, Kimms & McDowell LLP

(57) ABSTRACT

A zoom lens includes a first lens unit, a second lens unit, a third lens unit and a fourth lens unit that includes a 41 lens group and a 42 lens group. The 41 lens group includes a 411 lens group and a 412 lens group. A lens surface on a most image side of the 411 lens unit has a shape convex to the image side and a lens surface on the most object side of the 412 lens unit has a shape concave to the object side. A curvature radius r411 of the lens surface on the most image side of the 411 lens unit, a curvature radius r412 of the lens surface on the most object side of the 412 lens unit, and lateral magnification β3w of the third lens unit at a wide-angle end are respectively appropriately set.

10 Claims, 23 Drawing Sheets

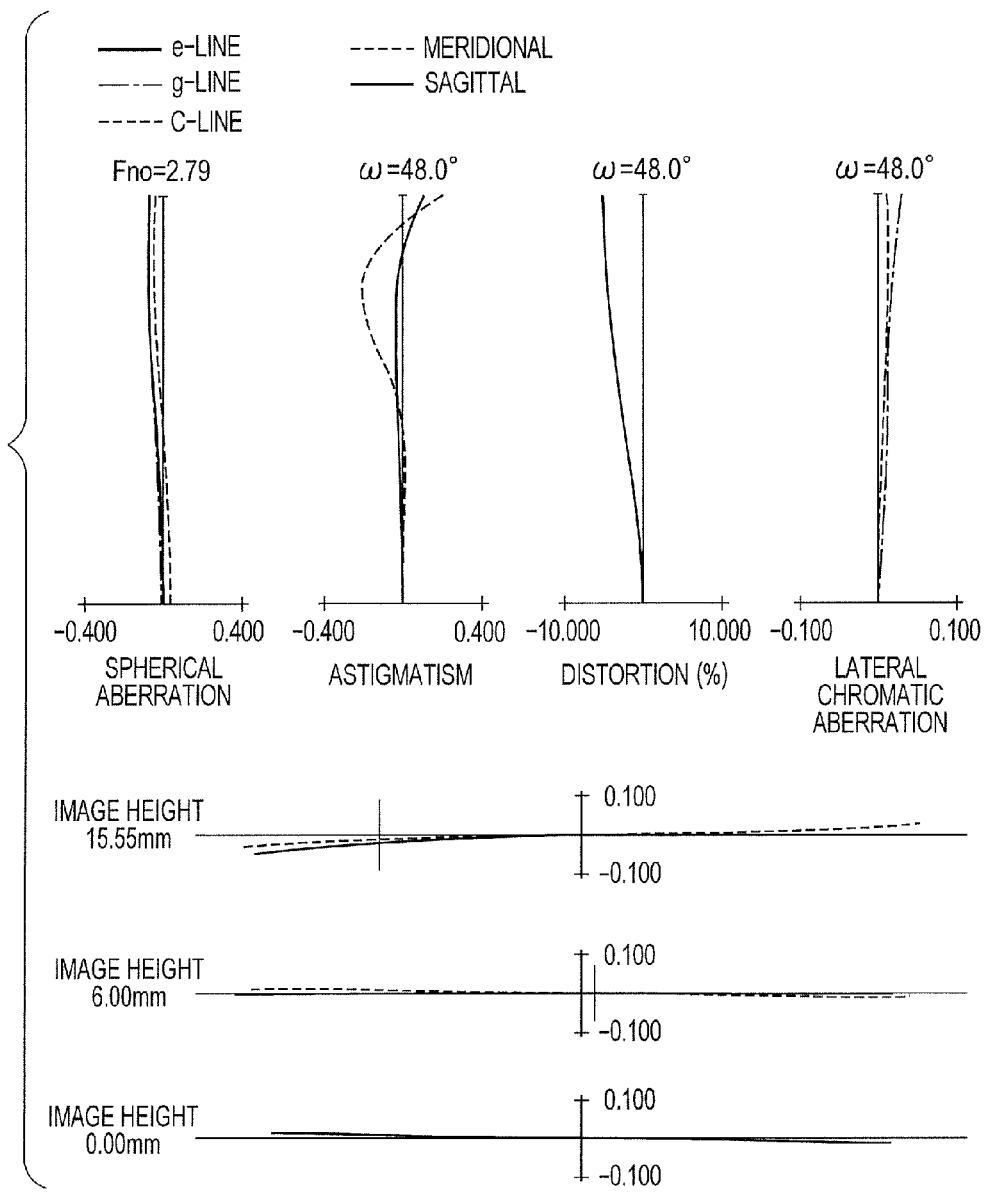

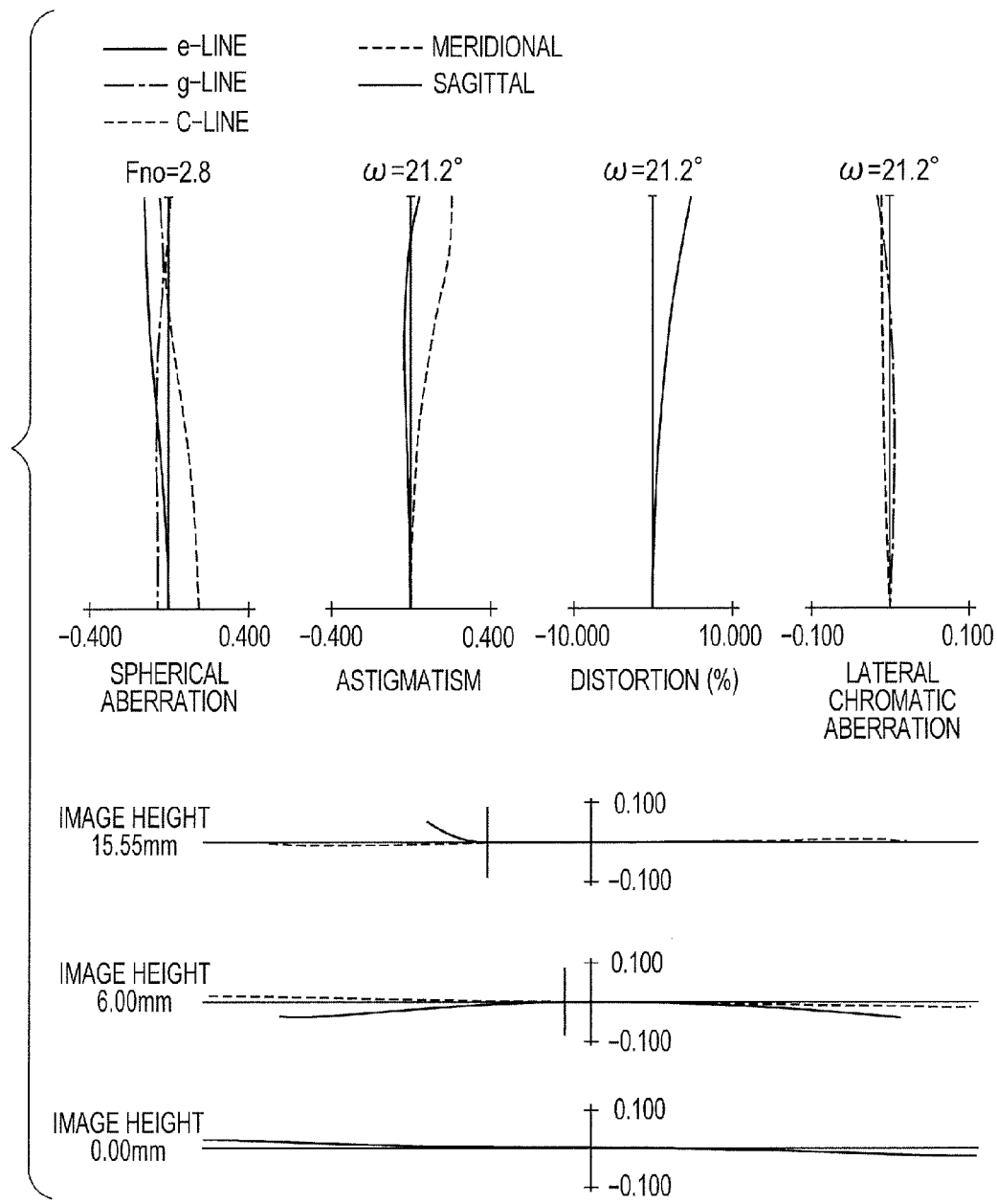

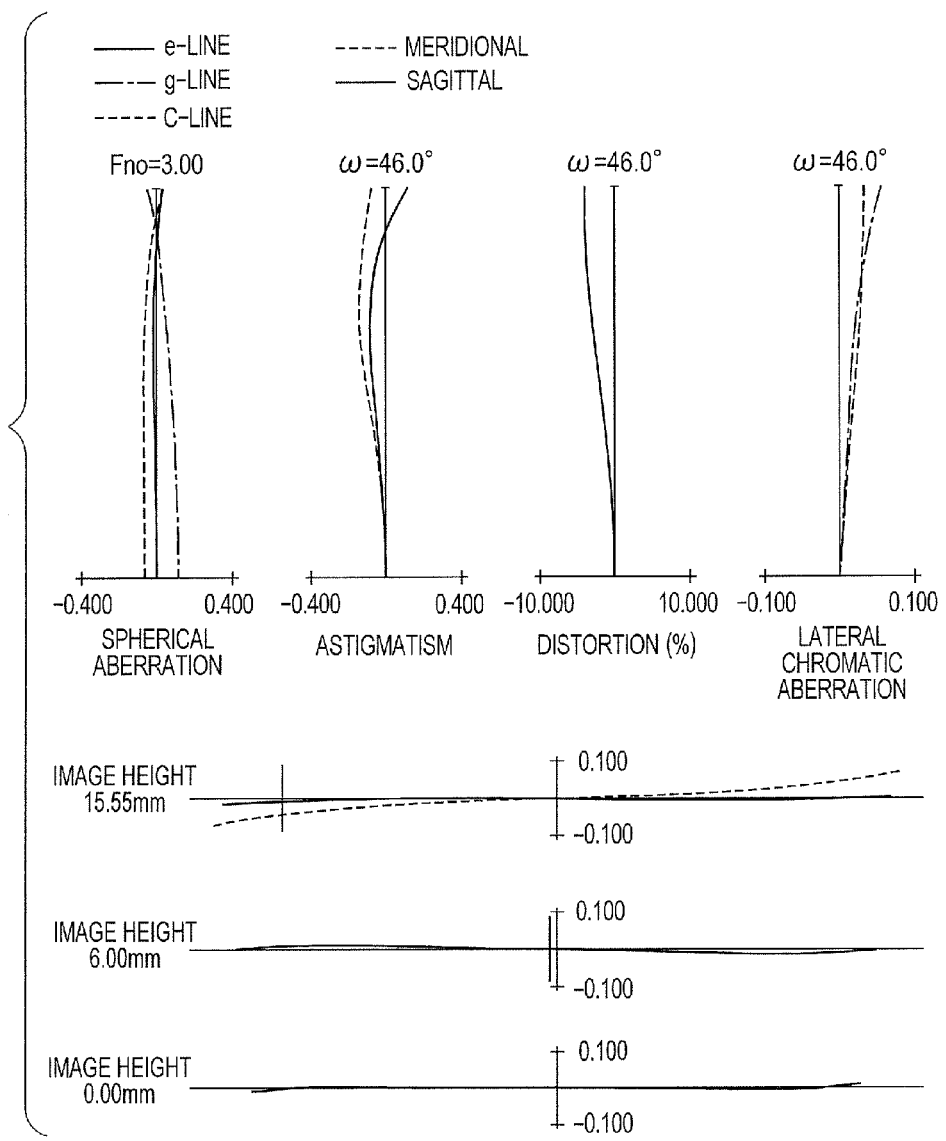

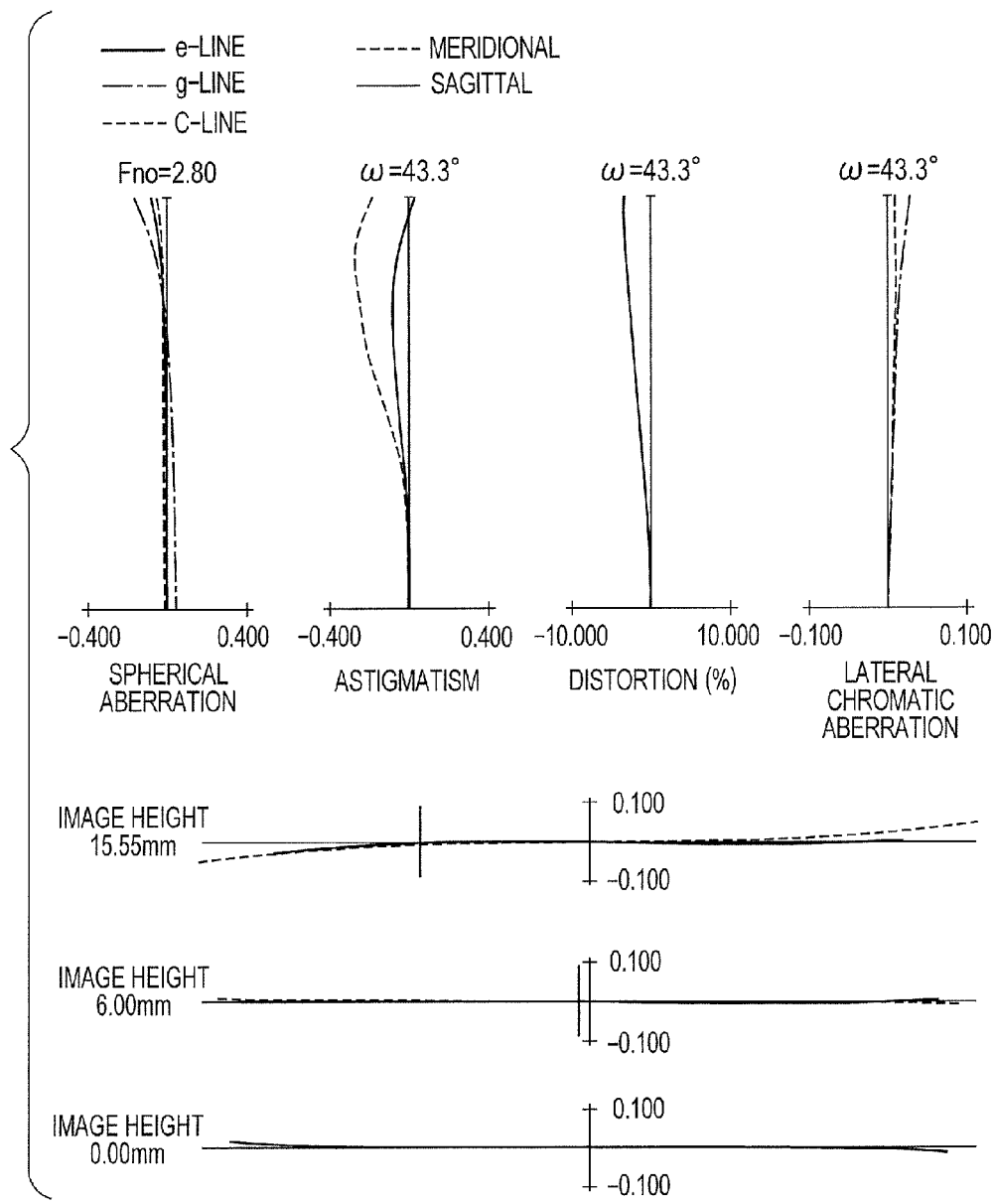

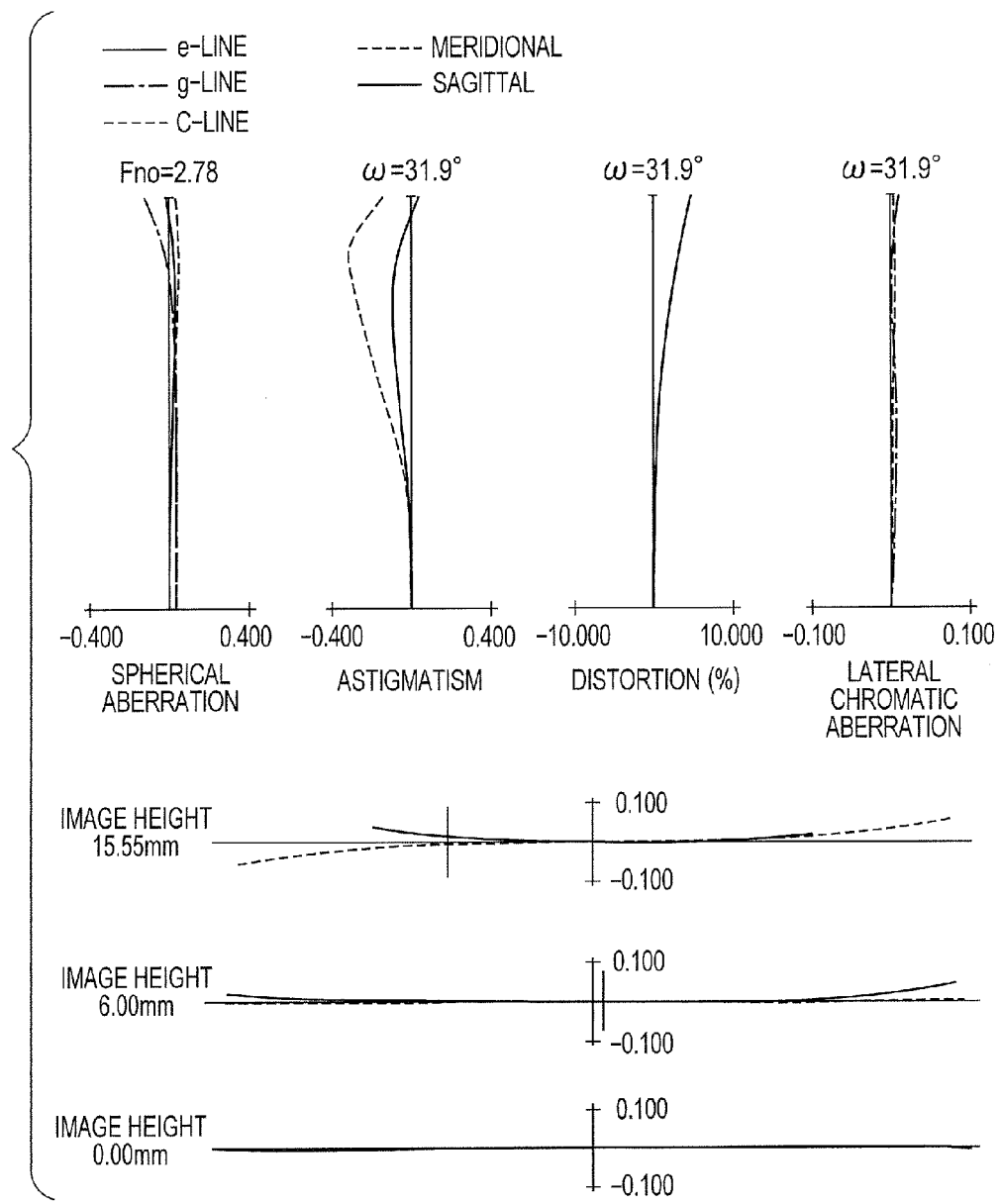

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same and is suitable for, for example, a television camera for broadcasting, a movie camera, a video camera, a digital still camera, a surveillance camera and a camera for silver-halide photographs.

2. Description of the Related Art

In recent years, for image pickup apparatuses such as a television camera, a movie camera, a camera for silver-halide films, a digital camera and a video camera, there is a need for a zoom lens having a wide angle of field, a high zoom ratio and high optical performance in a wide zoom range. Various zoom lenses having wide angles of view and high zoom ratios have been known. For example, a so-called four-unit zoom lens has been known, which includes, in order from an object side to an image side, a first lens unit having positive refractive power, a second lens unit having negative refractive power for magnification-varying, a third lens unit having positive refractive power for correcting image plane variation caused by magnification-varying, and a fourth lens unit having positive refractive power for imaging (Japanese Patent Application Laid-Open No. 2001-356381).

Japanese Patent Application Laid-Open No. 2001-356381 discloses a four-unit zoom lens having a zoom ratio of about 2.5 and an angle of shooting view at a wide-angle end of about 30°.

It is relatively easy to provide a wider angle of field of the four-unit zoom lens having the lens configuration described above. To realize a further wide angle of field in the four-unit zoom lens, it is necessary to intensify the refractive power of the first lens unit. However, if the refractive power of the first lens unit is intensified, variation in aberrations in zooming increases. This makes it difficult to obtain high optical performance in the entire zoom range.

On the other hand, if a plane subject to a high-order aberration is intentionally provided in the fourth lens unit having a relatively high degree of freedom of a lens configuration, it is easy to suppress aberration variation in zooming and keep optical performance over the entire zoom range in a well-balanced state. In general, a lens surface having high refractive power is necessary to generate a high-order aberration. Consequently, providing the plane subject to a high-order aberration in an optical system results in an increase in sensitivity, which is a change in optical performance with respect to a change in the position of the provided lens surface. This makes it difficult to manufacture and assemble the zoom lens.

To make it easy to manufacture the four-unit zoom lens and obtain high optical performance over the entire zoom range while realizing a wider angle of field, it is important to appropriately design, in particular, the lens configuration of the fourth lens unit that does not move for zooming and the shapes and the like of the respective lenses included in the fourth lens unit. If these configurations are inappropriately specified, it is difficult to manufacture the zoom lens and obtain high optical performance over the entire zoom range while realizing a wider angle of field.

SUMMARY OF THE INVENTION

The present invention provides a zoom lens that has a wide angle of field and a high zoom ratio and can be easily manufactured and with which high optical performance can be obtained over the entire zoom range and an image pickup apparatus including the zoom lens.

A zoom lens according to the present invention includes, in order from an object side to an image side, a first lens unit having positive refractive power that does not move for zooming, a second lens unit having negative refractive power that moves during zooming, a third lens unit having positive refractive power that moves during zooming, and a fourth lens unit having positive refractive power that does not move for zooming. The fourth lens unit includes a 41 lens group and a 42 lens group in order from the object side to the image side across a longest air interval. When the longest air interval in the 41 lens group corresponds to Ld41, the 41 lens group includes a 411 lens group and a 412 lens group in order from the object side to the image side across the longest air interval, a lens surface on the most image side of the 411 lens group has a shape convex to the image side and a lens surface on the most object side of the 412 lens group has a shape concave to the object side, and the following conditions are satisfied:

$$-0.7 < 1/\beta 3w < 0.5;$$

$$-0.30 < Ld41/r411 < -0.02;$$

$$-0.30 < Ld41/r412 < -0.02; \text{ and}$$

$$0.5 < r411/r412 < 1.5,$$

where a curvature radius of the lens surface on the most image side of the 411 lens group corresponds to r411, a curvature radius of the lens surface on the most object side of the 412 lens group corresponds to r412, the zoom lens focuses on an infinite object, and lateral magnification of the third lens unit at a wide-angle end correspond to $\beta 3w$.

According to the present invention it is possible to obtain a zoom lens that has a wide angle of field and a high zoom ratio and can be easily manufactured and with which high optical performance can be obtained over the entire zoom range and an image pickup apparatus including the zoom lens.

Further features of the present invention will become apparent from the following description of exemplary embodiments with reference to the attached drawings.

BRIEF DESCRIPTION OF THE DRAWINGS

FIG. 2A an aberration diagram of the zoom lens focused on the infinite object at the wide-angle end in the numerical embodiment 1.

FIG. 2C is an aberration diagram of the zoom lens focused on the infinite object at a telephoto end in the numerical embodiment 1.

FIG. 8A is an aberration diagram of the zoom lens focused on the infinite object at the wide-angle end in the numerical embodiment 4.

FIG. 10A is an aberration diagram of the zoom lens focused on the infinite object at the wide-angle end in the numerical embodiment 5.

FIG. 10B is an aberration diagram of the zoom lens focused on the infinite object in an intermediate zoom position in the numerical embodiment 5.

DESCRIPTION OF THE EMBODIMENTS

Preferred embodiments of the present invention will now be described in detail in accordance with the accompanying drawings.

Exemplary embodiments of the present invention are described in detail below on the basis of the drawings. A zoom lens according to the present invention includes, in order from an object side to an image side, a first lens unit having positive refractive power that does not move for zooming and a second lens unit having negative refractive power moved during zooming.

The zoom lens further includes a third lens unit U3 having positive refractive power moved for correcting variation of an image plane caused by zooming and a fourth lens unit having positive refractive power that does not move for zooming. The fourth lens unit U4 include a 41 lens group and a 42 lens group in order from the object side to the image side across a longest air interval. When the longest air interval in the 41 lens group is represented as Ld41, the 41 lens group includes a 411 lens group and a 412 lens group in order from the object side to the image side across the air interval Ld41.

Figure 1:
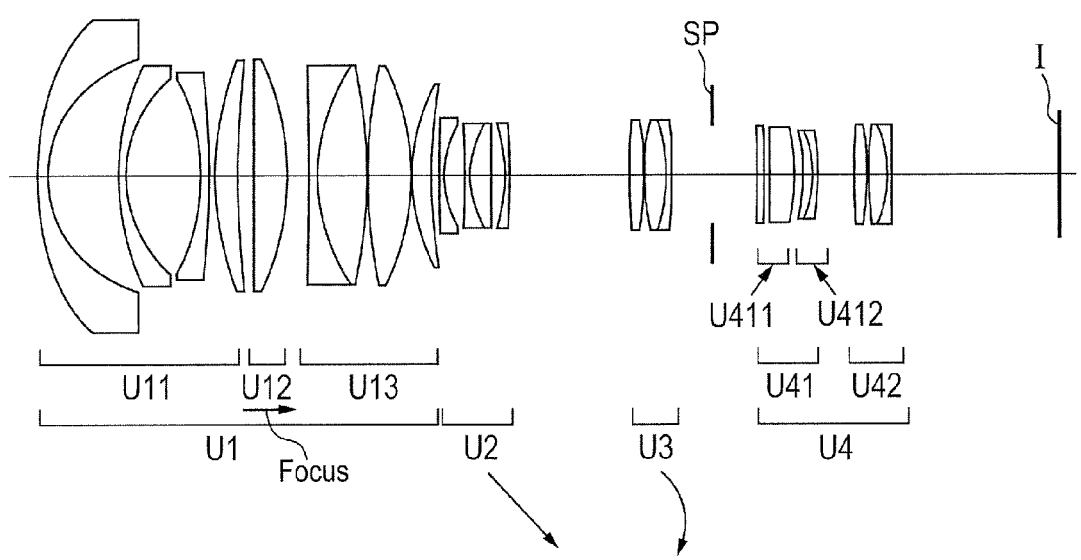
FIG. 1 is a sectional view of a zoom lens focused on an infinite object at a wide-angle end in a numerical embodiment 1.
Figure 2B:
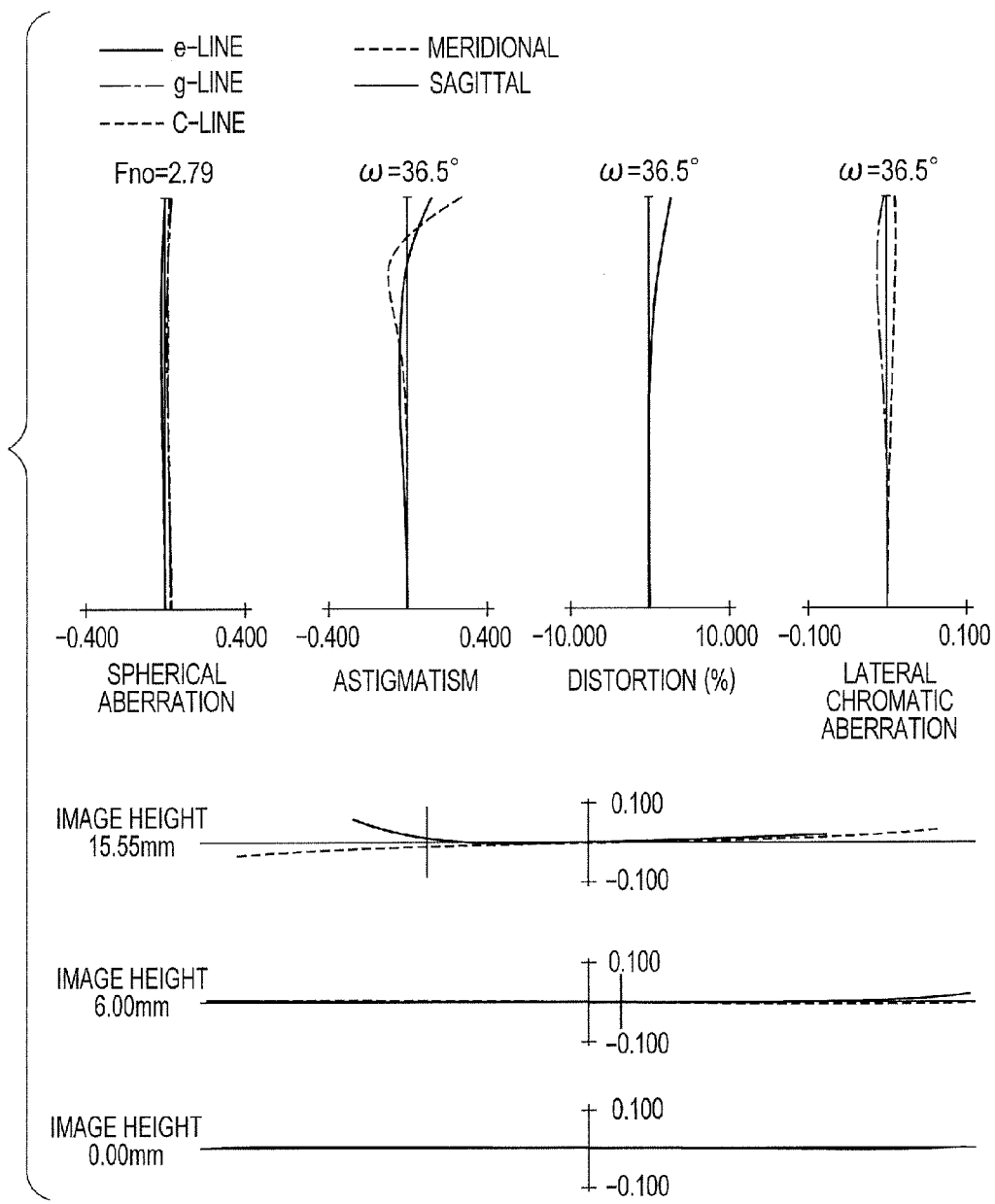
FIG. 2B is an aberration diagram of the zoom lens focused on the infinite object in an intermediate zoom position in the numerical embodiment 1.

FIG. 1 is a sectional view of a zoom lens focused on an infinite object at a wide-angle end (a short focal length end) (foal length f=14 mm) of a zoom lens in a first embodiment of the present invention (a numerical embodiment 1). FIGS. 2A to 2C are aberration diagrams of the zoom lens focused on the infinite object at the wide-angle end, in an intermediate zoom position (focal length f=21 mm) and at a telephoto end (a long focal length end) (foal length f=40 mm) in the numerical embodiment 1. Note that the focal length is a value representing a value in a numerical embodiment in "mm". The same holds true in respective embodiments described below.

Figure 3:
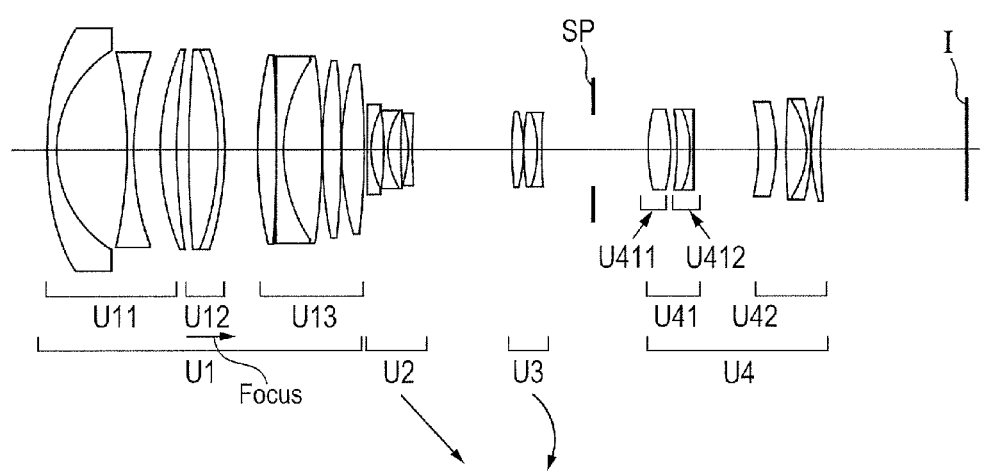
FIG. 3 is a sectional view of a zoom lens focused on an infinite object at a wide-angle end in a numerical embodiment 2.
Figure 4A:
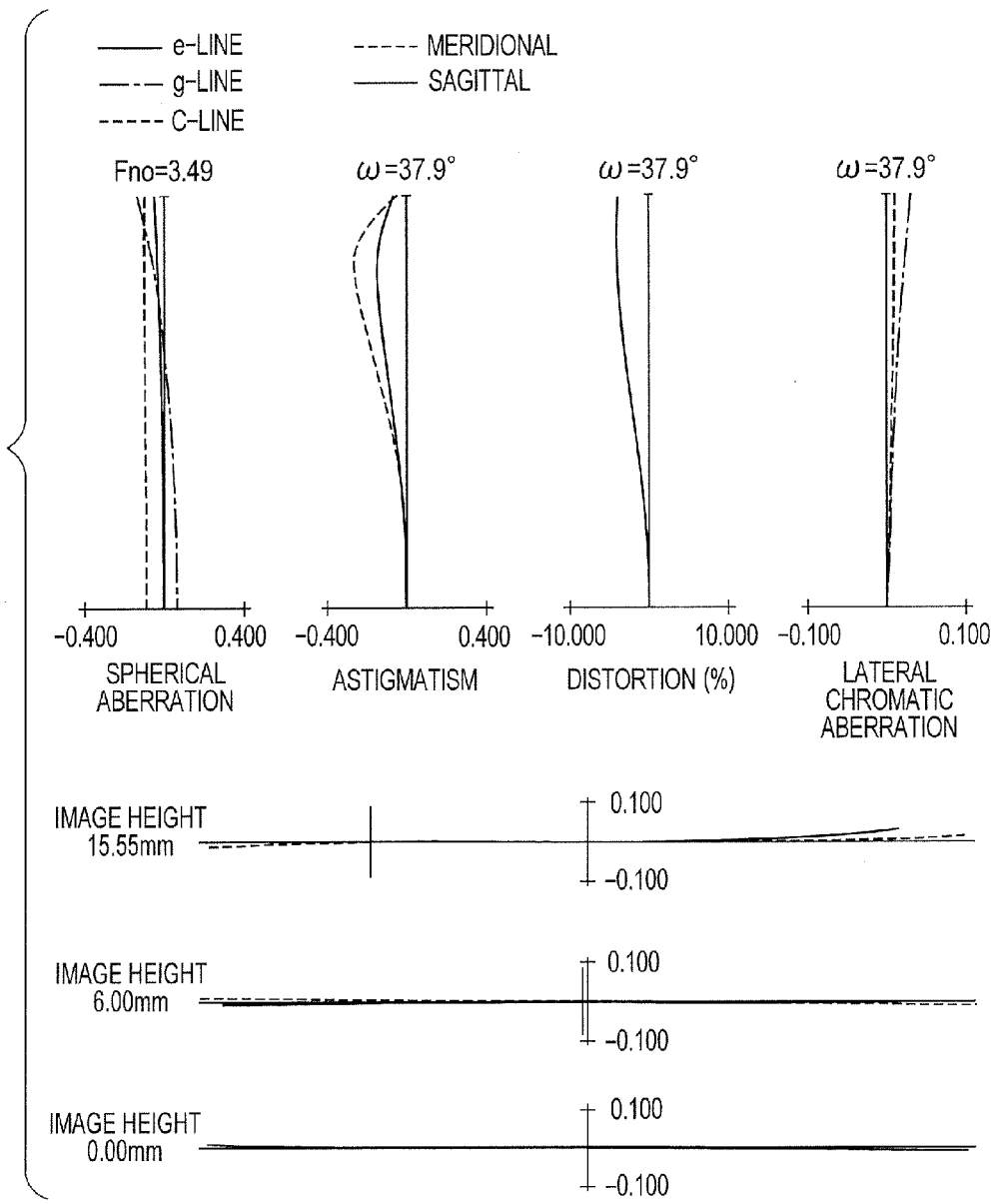
FIG. 4A is an aberration diagram of the zoom lens focused on the infinite object at the wide-angle end in the numerical embodiment 2.
Figure 4B:
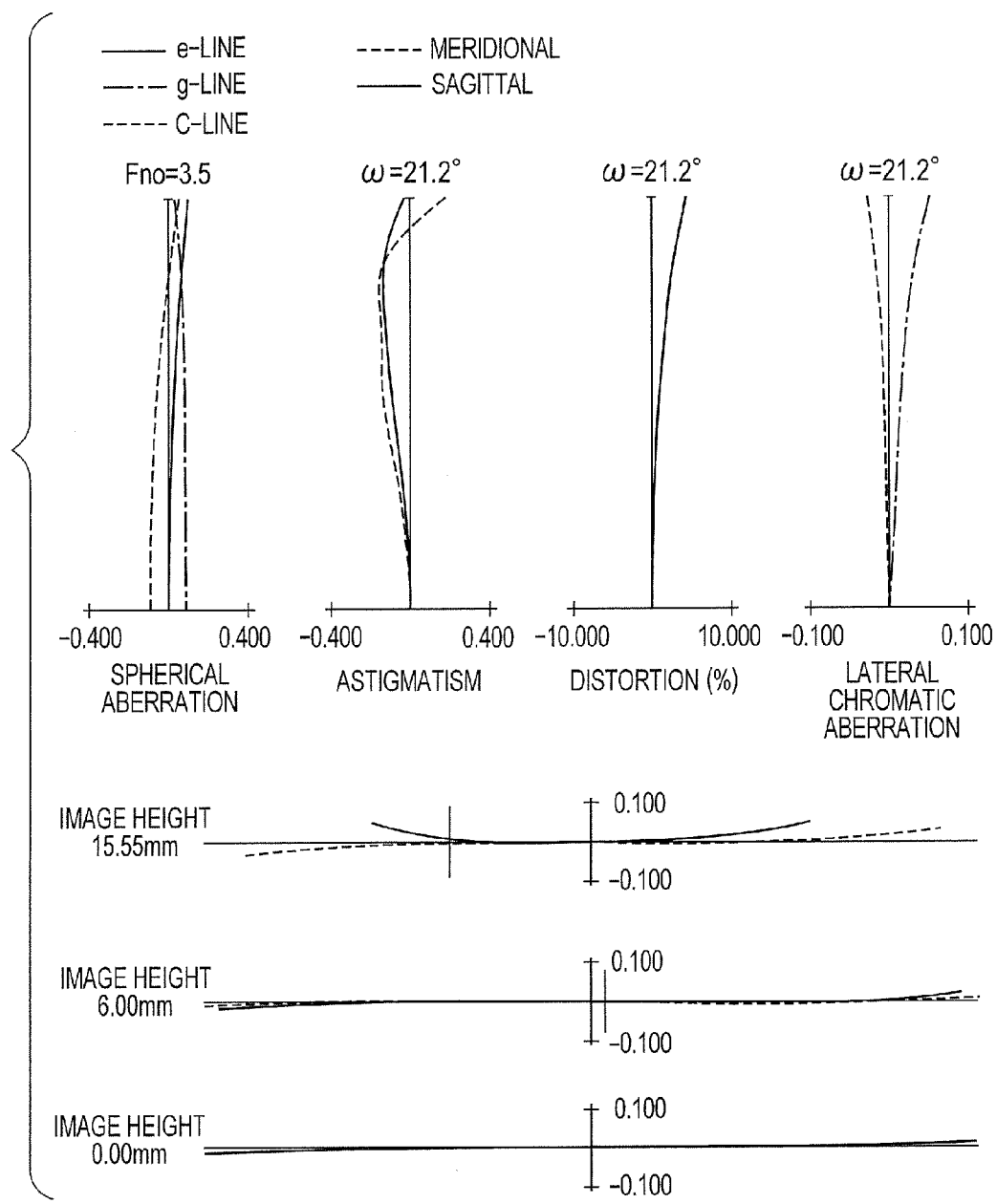
FIG. 4B is an aberration diagram of the zoom lens focused on the infinite object in an intermediate zoom position in the numerical embodiment 2.
Figure 4C:
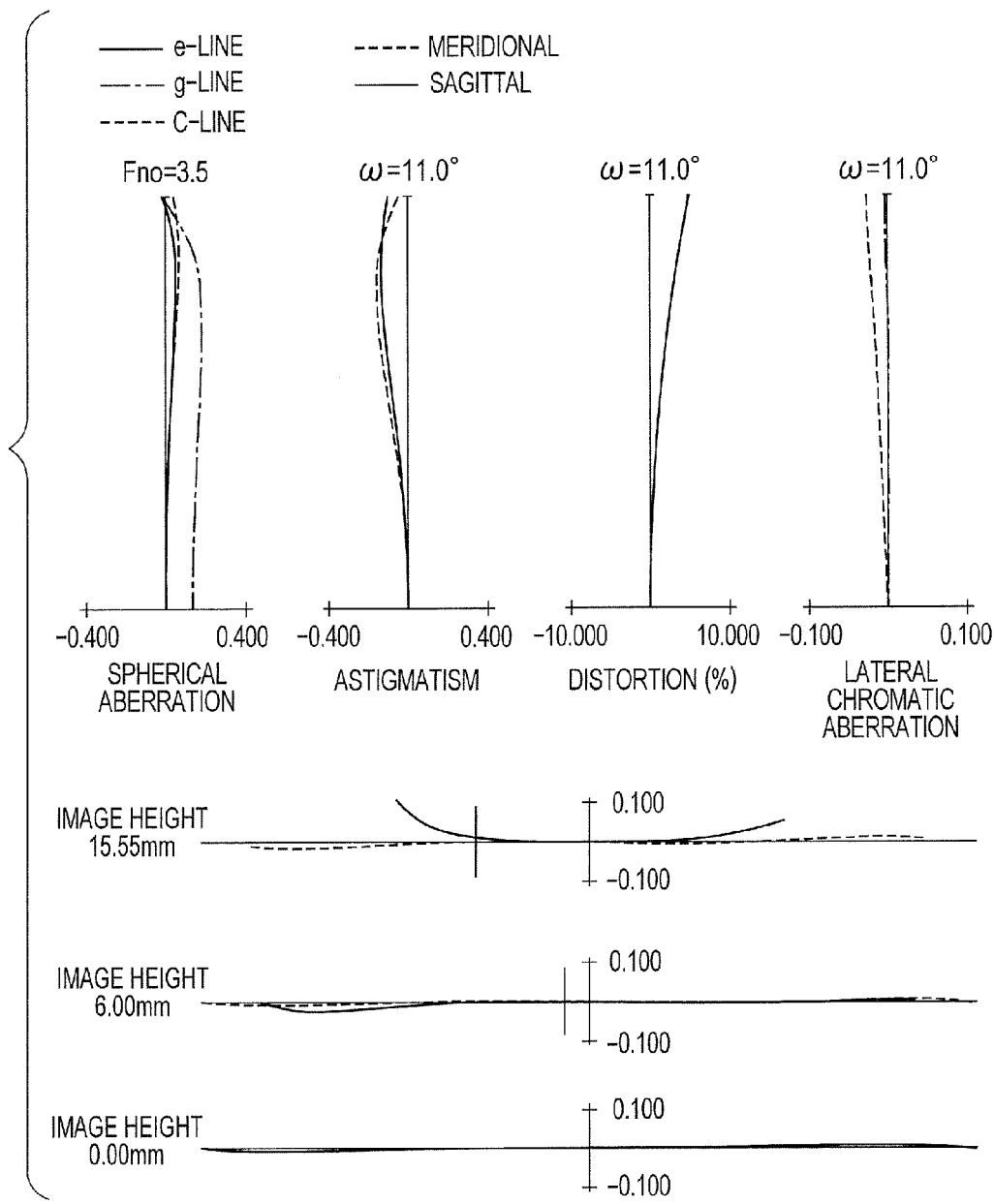
FIG. 4C is an aberration diagram of the zoom lens focused on the infinite object at a telescope end in the numerical embodiment 2.

FIG. 3 is a sectional view of a zoom lens focused on an infinite object at a wide-angle end of a zoom lens (focal length f=20 mm) in a second embodiment of the present invention (a numerical embodiment 2). FIGS. 4A to 4C are aberration diagrams during focusing on the infinite object at the wide-angle end, in an intermediate zoom position (focal length f=40 mm) and at a telephoto end (focal length f=80 mm).

Figure 5:
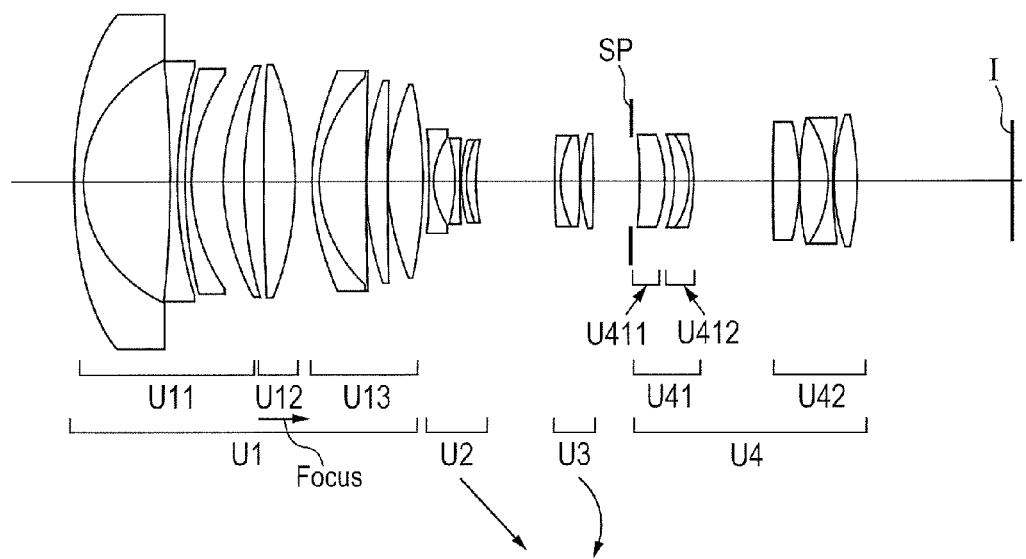
FIG. 5 is a sectional view of a zoom lens focused on an infinite object at a wide-angle end in a numerical embodiment 3.
Figure 6A:
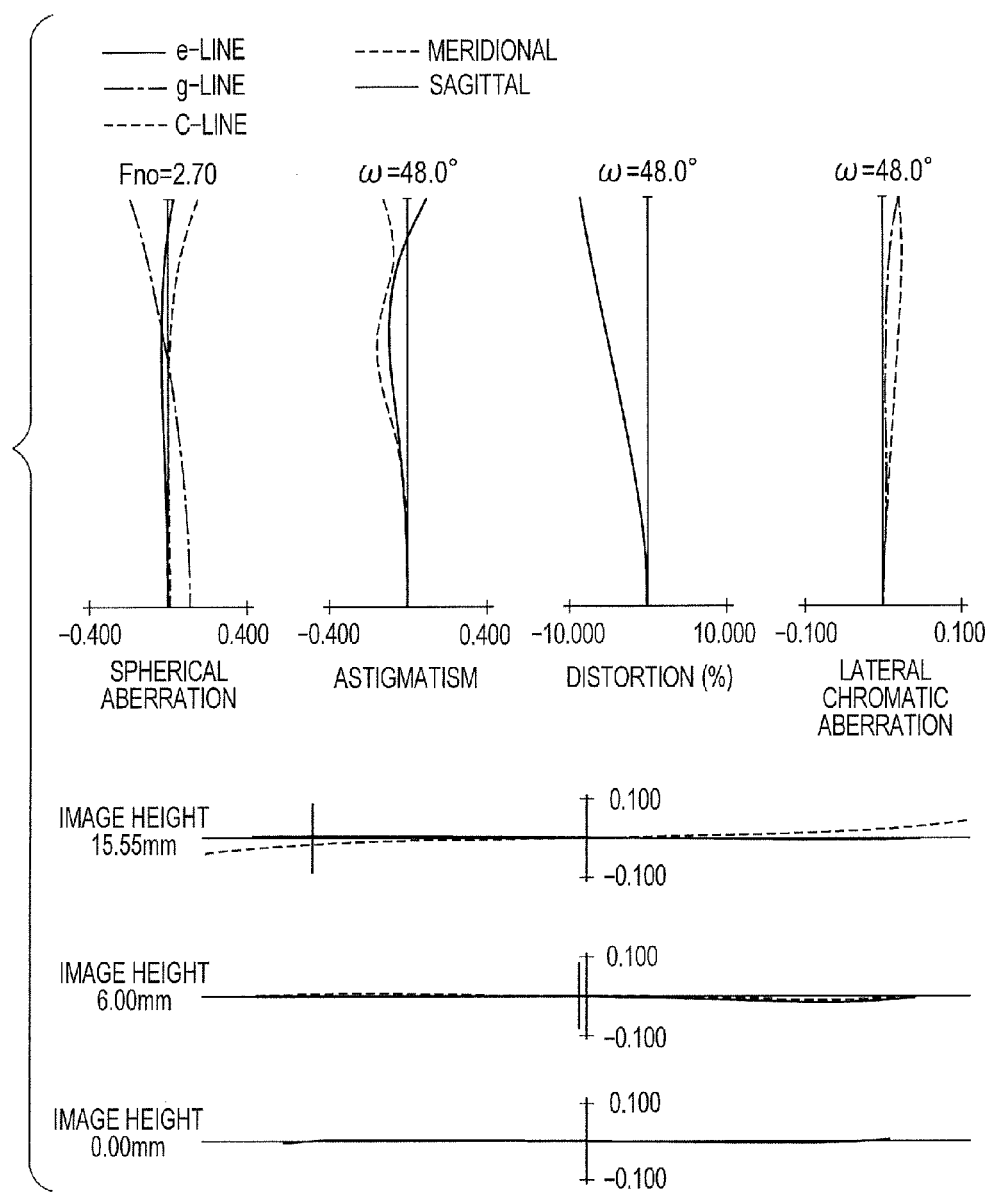
FIG. 6A is an aberration diagram of the zoom lens focused on the infinite object at the wide-angle end in the numerical embodiment 3.
Figure 6B:
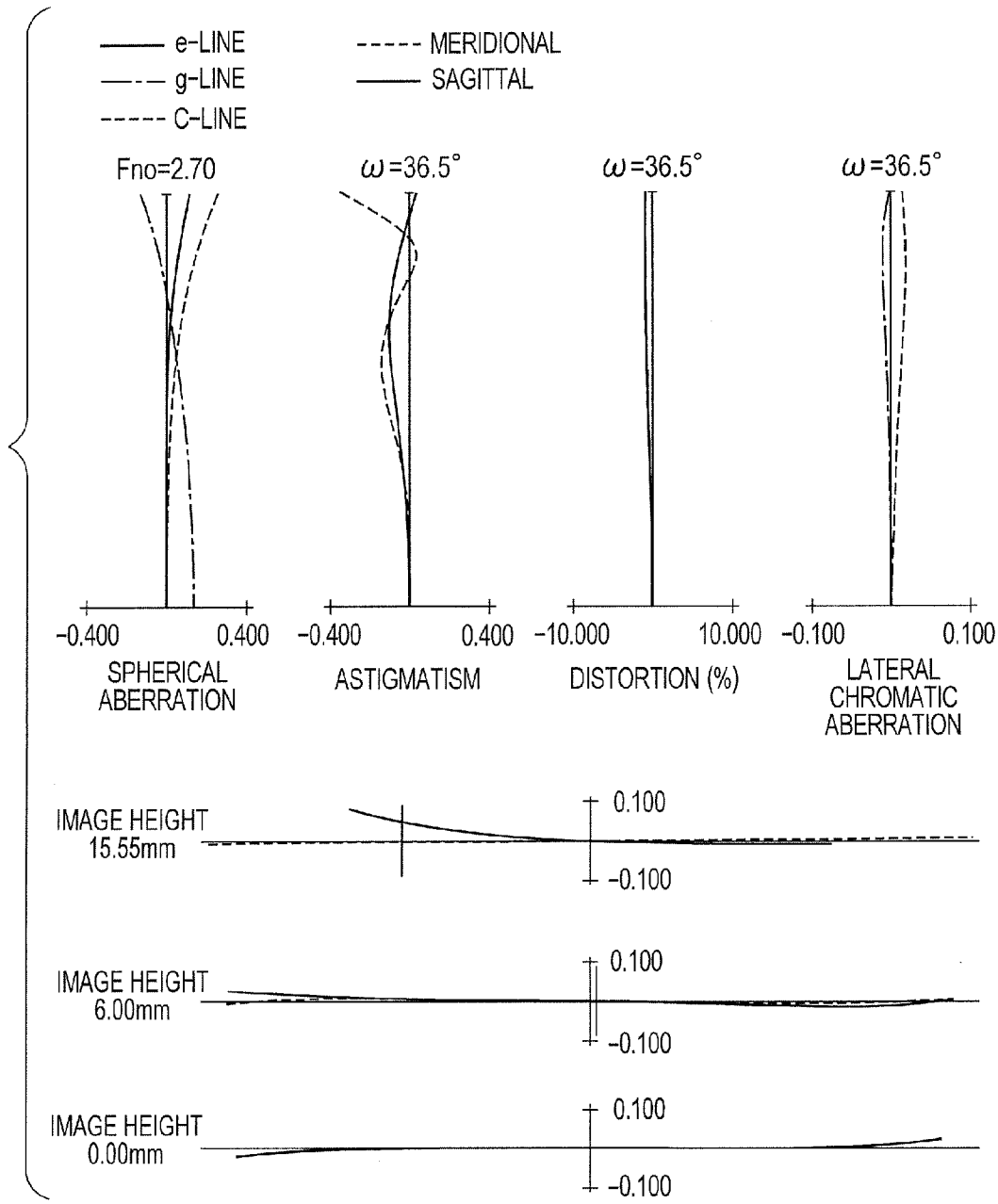
FIG. 6B is an aberration diagram of the zoom lens focused on the infinite object in an intermediate zoom position in the numerical embodiment 3.
Figure 6C:
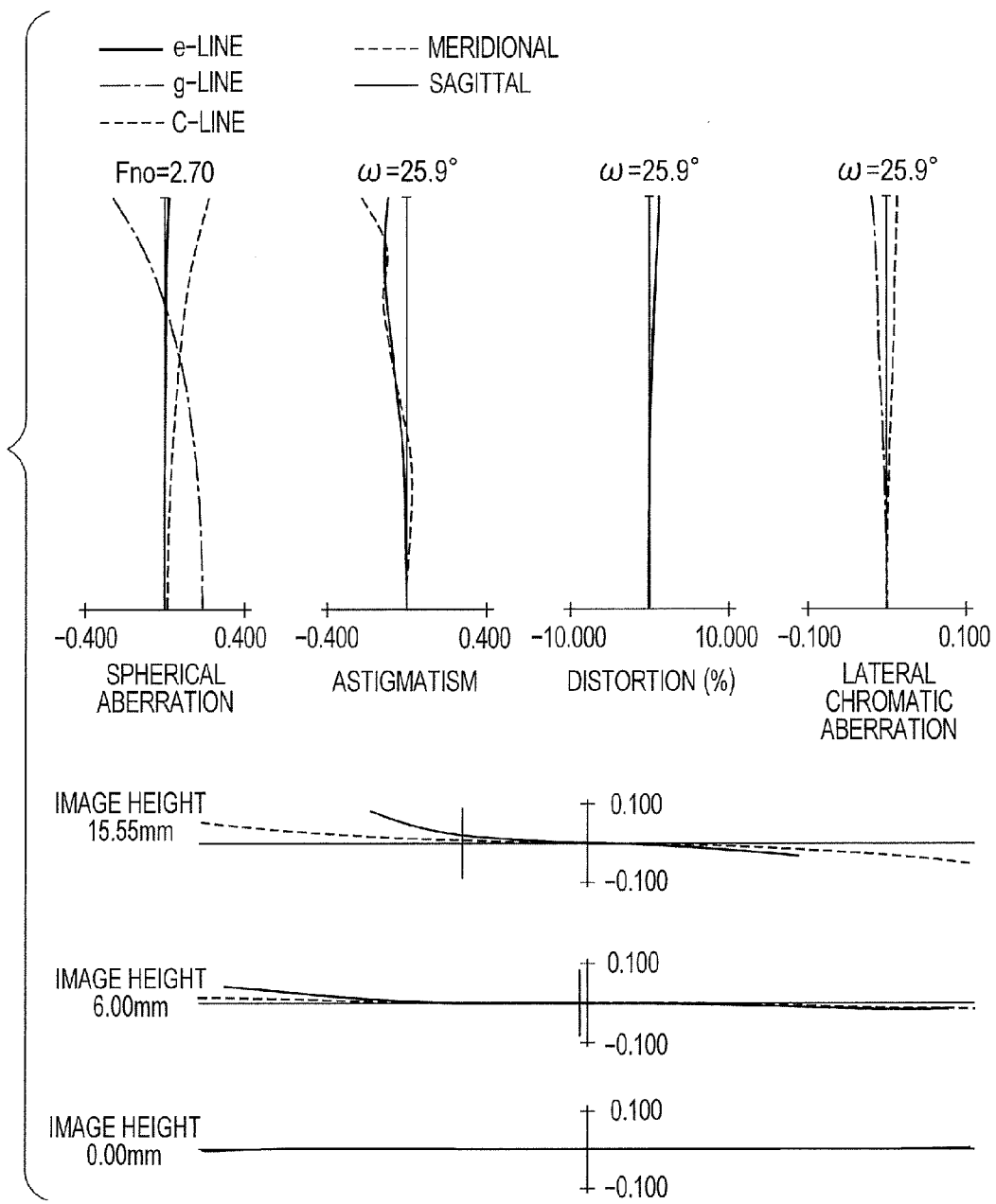
FIG. 6C is an aberration diagram of the zoom lens focused on the infinite object at a telephoto end in the numerical embodiment 3.

FIG. 5 is a sectional view of a zoom lens focused on an infinite object at a wide-angle end of a zoom lens (focal length f=14 mm) in a third embodiment of the present invention (a numerical embodiment 3). FIGS. 6A to 6C are aberration diagrams during focusing on the infinite object at the wide-angle end, in an intermediate zoom position (focal length f=21 mm) and at a telephoto end (focal length f=32 mm) in the numerical embodiment 3.

Figure 7:
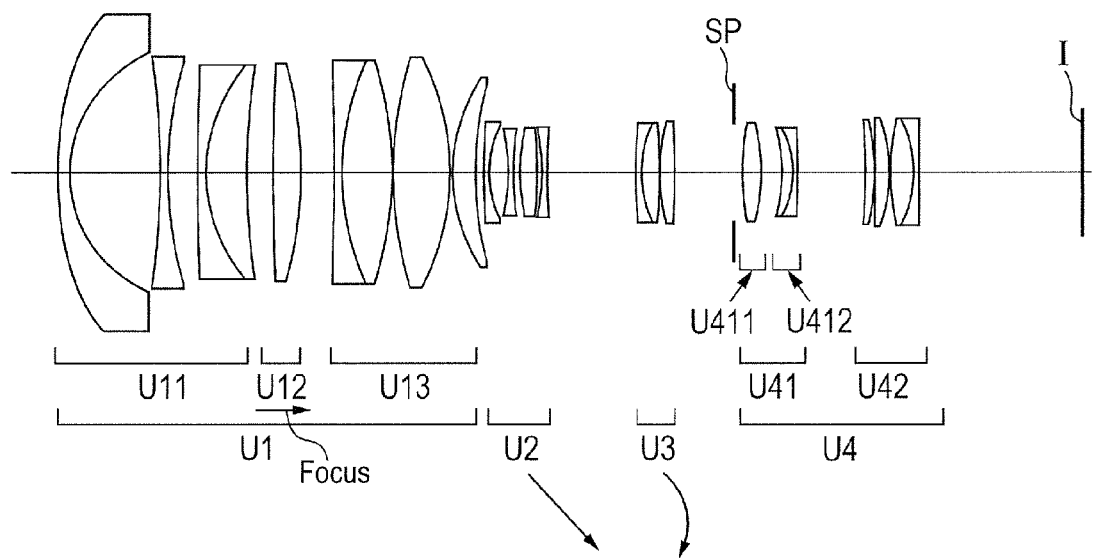
FIG. 7 is a sectional view of a zoom lens focused on an infinite object at a wide-angle end in a numerical embodiment 4.
Figure 8B:
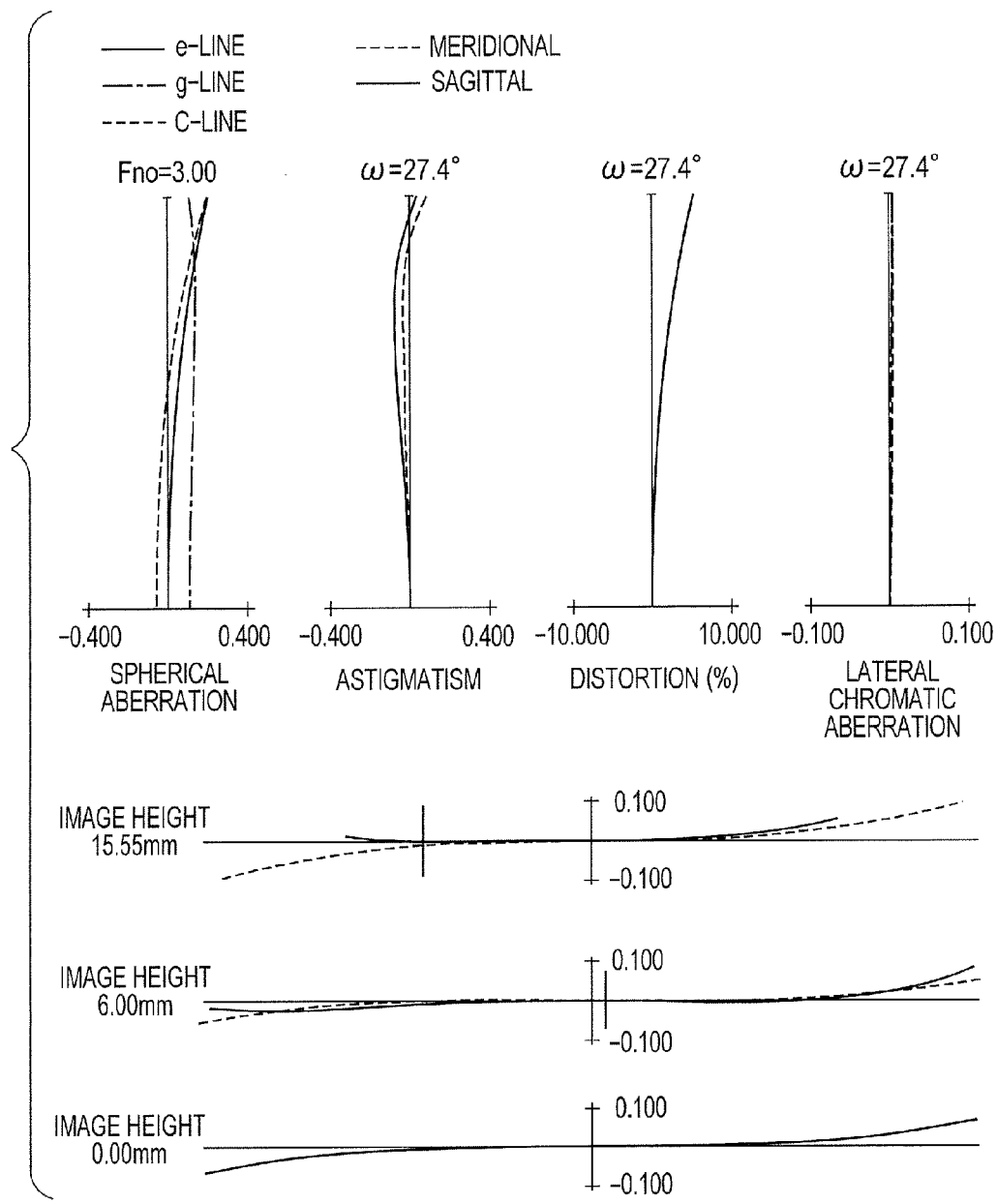
FIG. 8B is an aberration diagram of the zoom lens focused on the infinite object in an intermediate zoom position in the numerical embodiment 4.
Figure 8C:
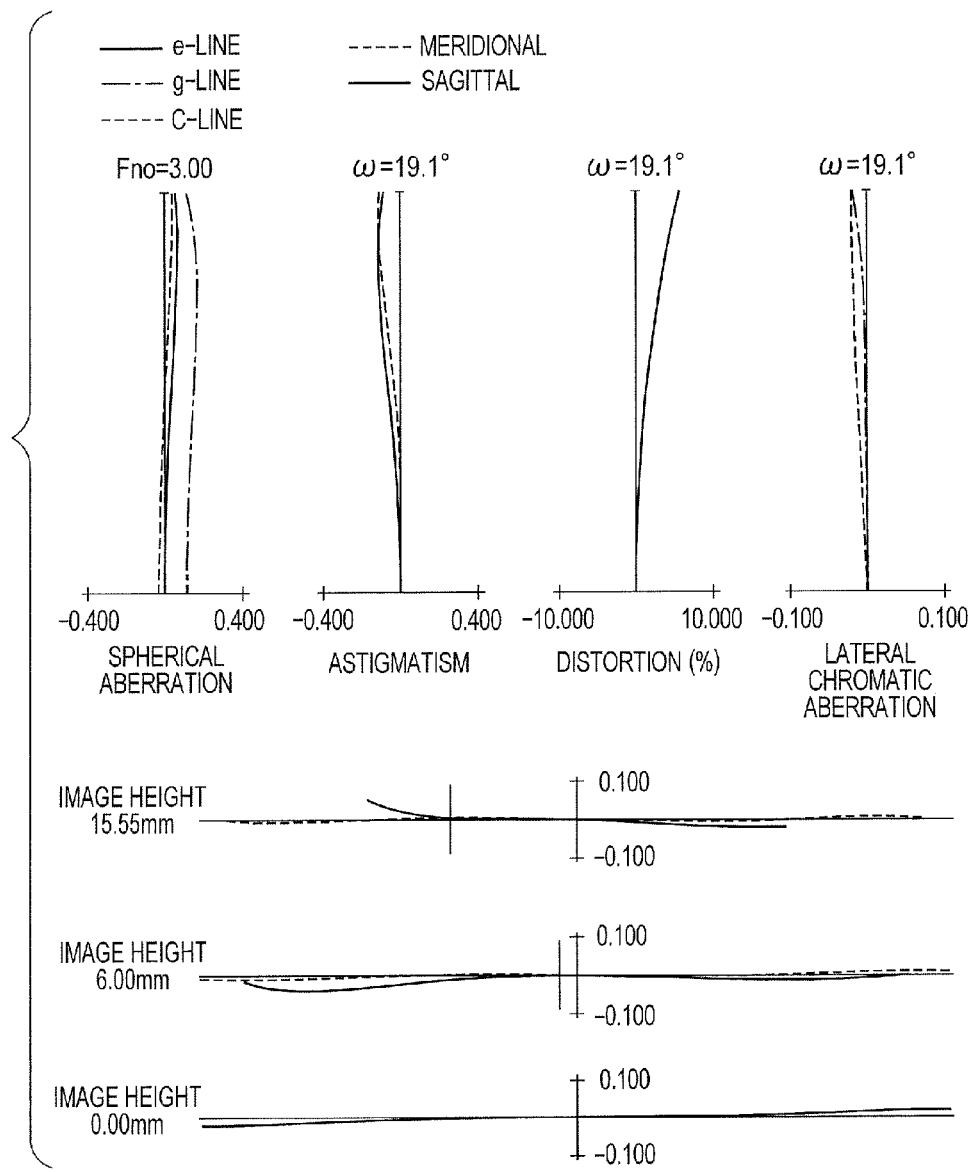
FIG. 8C is an aberration diagram of the zoom lens focused on the infinite object at a telephoto end in the numerical embodiment 4.

FIG. 7 is a sectional view of a zoom lens focused on an infinite object at a wide-angle end of a zoom lens (focal length f=15 mm) in a fourth embodiment of the present invention (a numerical embodiment 4). FIGS. 8A to 8C are aberration diagrams during focusing on the infinite object at the wide-angle end, in an intermediate zoom position (focal length f=30 mm) and at a telephoto end (focal length f=45 mm) in the numerical embodiment 4.

Figure 9:
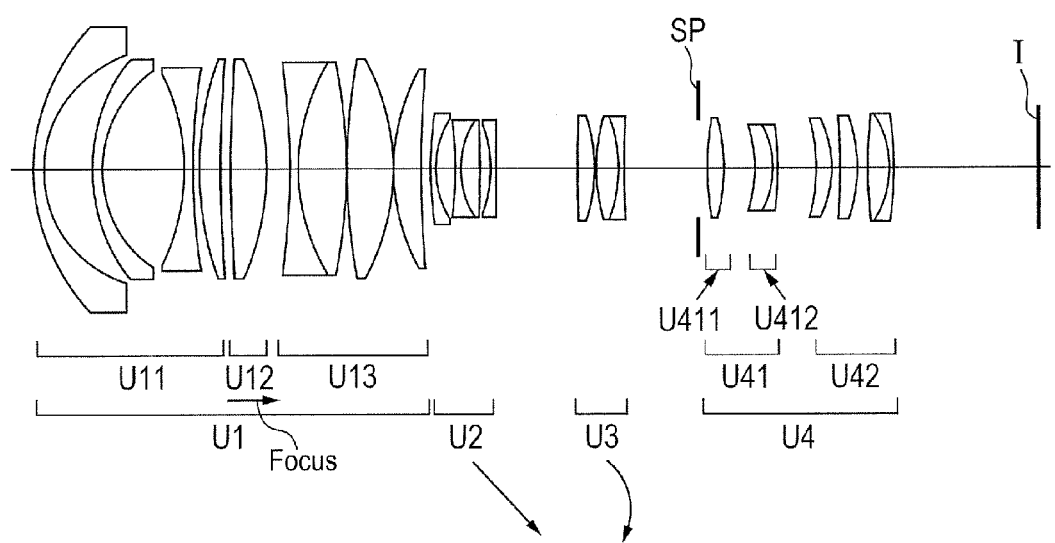
FIG. 9 is a sectional view of a zoom lens focused on an infinite object at a wide-angle end in a numerical embodiment 5.
Figure 10C:
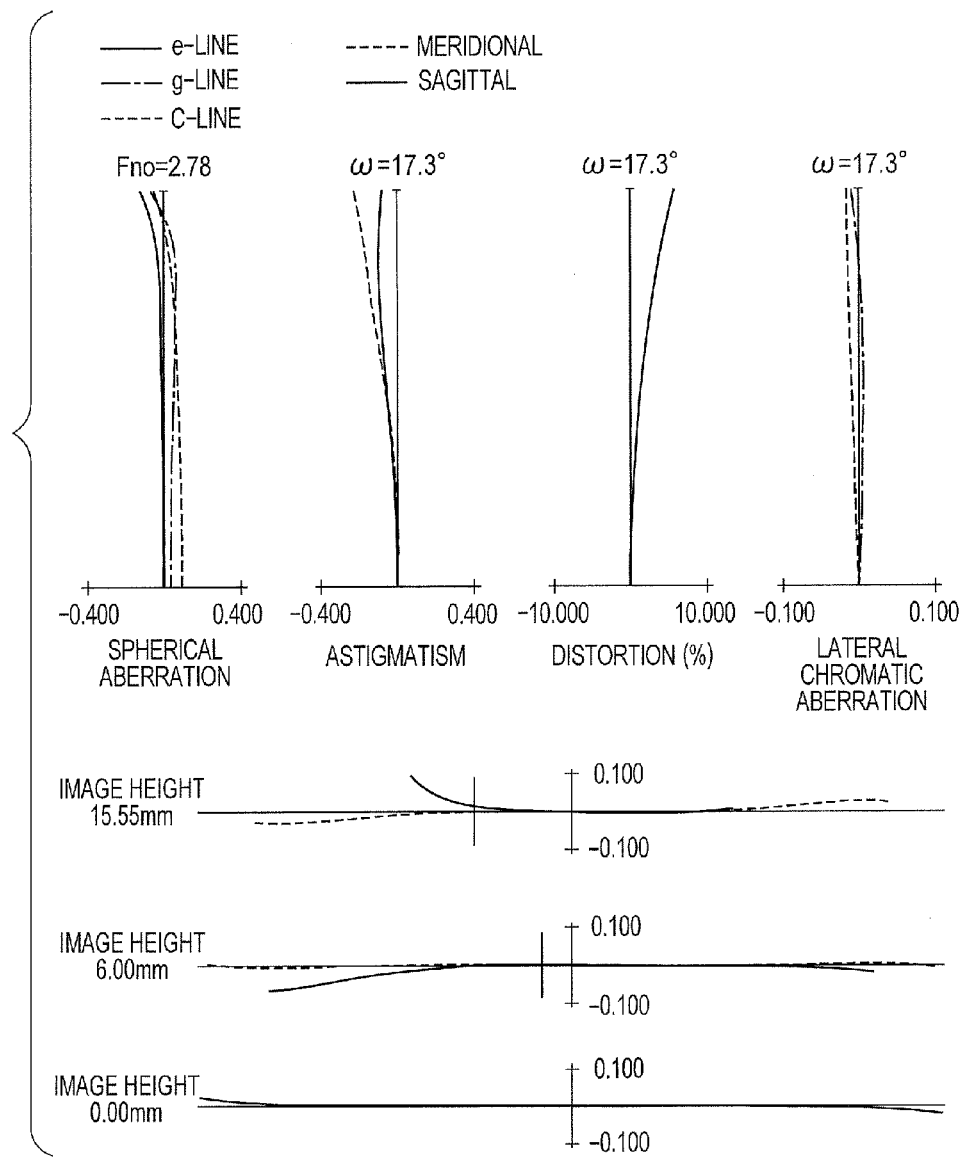
FIG. 10C is an aberration diagram of the zoom lens focused on the infinite object at a telephoto end in the numerical embodiment 5.

FIG. 9 is a sectional view of a zoom lens focused on an infinite object at a wide-angle end of a zoom lens (focal length f=16.5 mm) in a fifth embodiment of the present invention (a numerical embodiment 5). FIGS. 10A to 10C are aberration diagrams during focusing on the infinite object at the wide-angle end, in an intermediate zoom position (focal length f=25 mm) and at a telephoto end (focal length f=50 mm) in the numerical embodiment 5.

Figure 11:
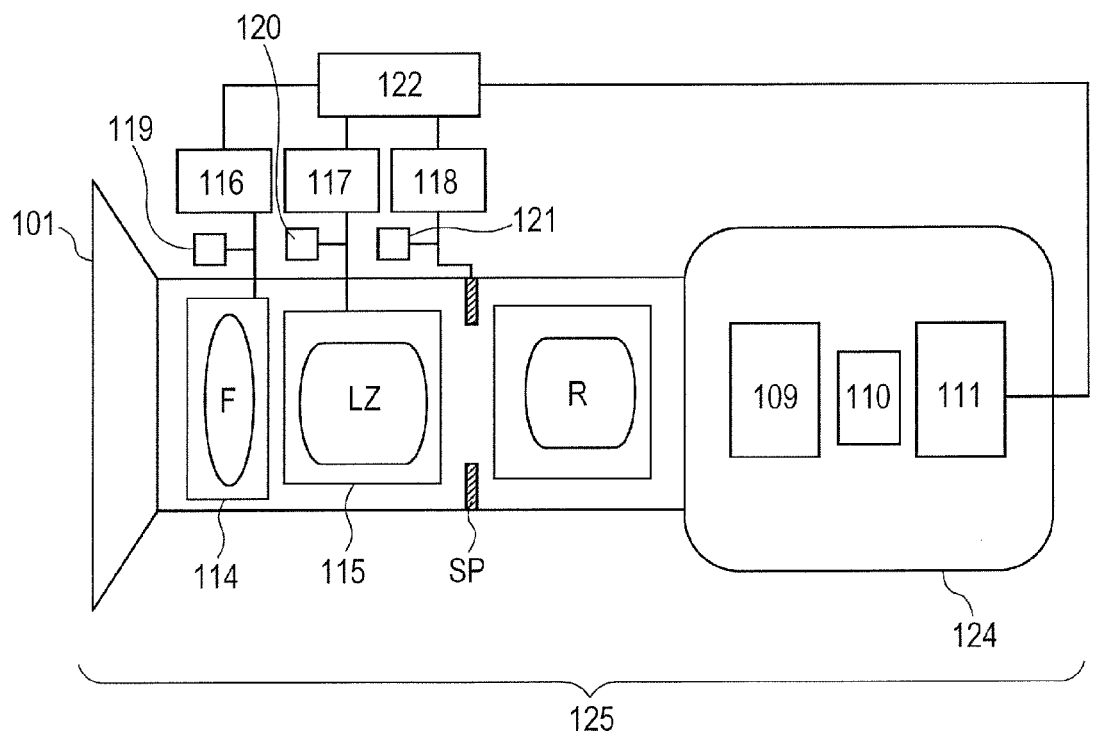
FIG. 11 is a main part schematic diagram of an image pickup apparatus according to the present invention.
Figure 12:
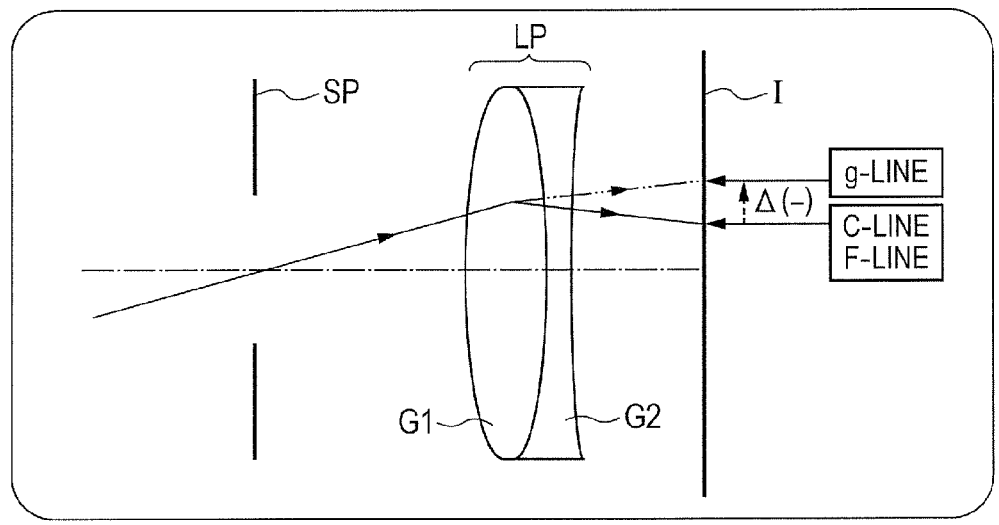
FIG. 12 is a schematic diagram concerning achromatism for two colors and remaining of a secondary spectrum due to a lens unit having a positive refractive power.
Figure 13:
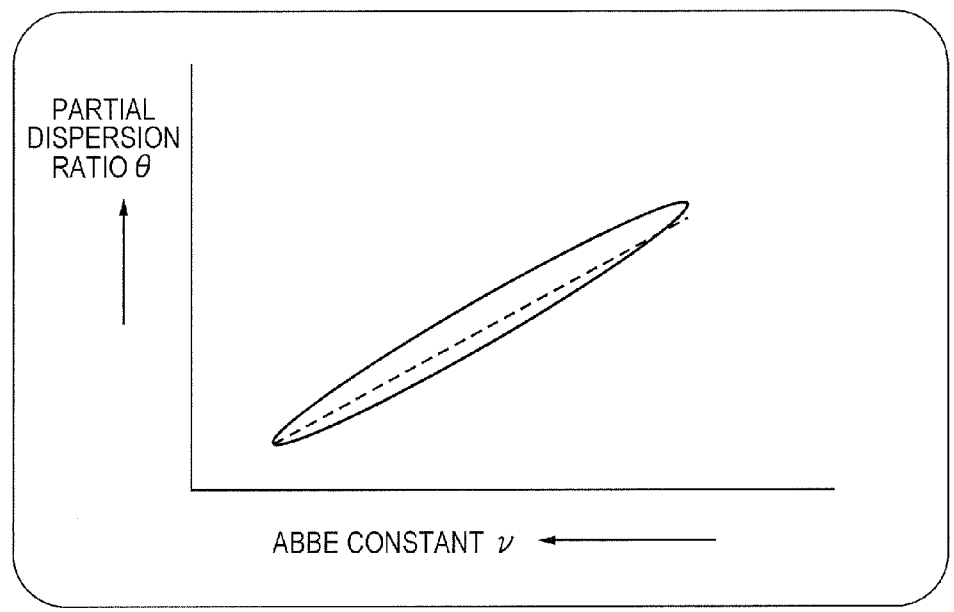
FIG. 13 is a schematic diagram of a distribution of an Abbe constant ν and a partial dispersion ratio θ of an optical material.
Figure 14:
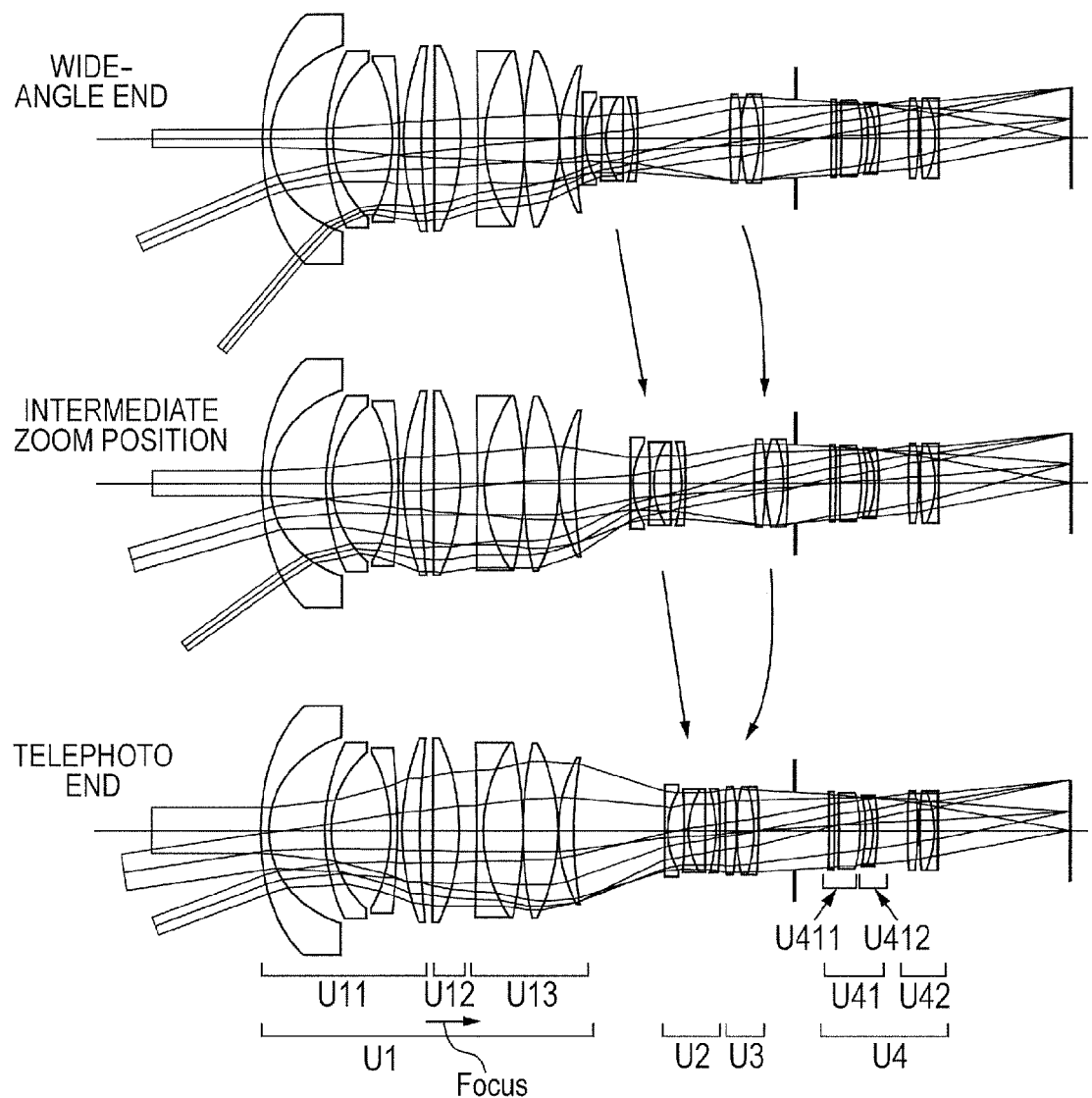
FIG. 14 is an optical path diagram of a zoom lens focused on the infinite object at the wide-angle end, in the intermediate zoom position, and at the telephoto end in the numerical embodiment 1.

FIG. 11 is a main part schematic diagram of an image pickup apparatus according to the present invention. FIG. 12 is a schematic diagram concerning achromatism for two colors and remaining of a secondary spectrum with respect to a lateral chromatic aberration of a lens unit LP having positive refractive power located between an aperture stop SP and an image plane I. FIG. 13 is a schematic diagram of a distribution of an Abbe constant ν and a partial dispersion ratio θ of a general optical material. FIG. 14 is an optical path diagram of a zoom lens focused on an infinite object at a wide-angle end (focal length f=14 mm), in an intermediate zoom position (focal length f=21 mm) and at a telephoto end (focal length f=40 mm) in the numerical embodiment 1. In the respective sectional views of the lenses, the left direction is a subject (object) side (the front direction) and the right direction is an image side (the rear direction).

In the sectional view of the zoom lenses, the zoom lenses have a first lens unit U1 having positive refractive power including a focusing lens unit. The first lens unit U1 includes, in order from the object side to the image side, a 11 lens group U11 having negative refractive power that does not move for focusing and a 12 lens group U12 having positive refractive power that moves in an optical axis direction during focusing. The first lens unit U1 further includes a 13 lens group U13 having positive refractive power that does not move for focusing.

Note that, in the respective embodiments described below, in focusing from an infinite object to a close end distance object, the 12 lens group U12 moves, with respect to a mechanism, from an object side end to an image side end in a movable range on an optical axis as indicated by an arrow marked Focus in FIG. 1.

The zoom lenses have a second lens unit U2 having negative refractive power including a lens unit for magnification-varying. The second lens unit U2 monotonously moves for magnification-varying to the image plane side on the optical path from the wide-angle end to the telephoto end. The zoom lenses have also a third lens unit U3 having positive refractive power that corrects image plane variation caused by the magnification-varying. The third lens unit U3 nonlinearly moves to the image side on the optical path in the magnification-varying from the wide-angle end to the telephoto end, passes a position on the most image plane side in the intermediate zoom position, and thereafter nonlinearly moves to the object side. That is, the third lens unit U3 moves on a track convex to the image side in zooming. The second lens unit U2 and the third lens unit U3 configure a magnifying group (a zooming group).

The zoom lenses have a stop SP (an aperture stop) and a fourth lens unit having positive refractive power for focusing that does not move for zooming. An image pickup surface I is provide and equivalent to an image pickup surface of a solid-state image pickup device (a photoelectric conversion device) that receives an image formed by the zoom lens and photoelectrically converts the image.

The zoom lens in the respective embodiments described above adopts a zoom type having a zoom ratio of about 2.8 to 4 and an aperture ratio of about 2.7 to 3.5 and suitable for obtaining satisfactory optical performance. In the longitudinal aberration diagram, spherical aberrations are represented by an e line (a solid line), a g line (an alternate long and two short dashes line), and a C line (a dotted line). Astigmatisms are represented by a meridional image plane (meri) (a dotted line) of the e line and a sagittal image plane (Sagi) (a solid line). Lateral chromatic aberrations are represented by a g line (an alternate long and two short dashes line) and a C line (a dotted line). Fno represents an F number and ω represents a shooting half angle of field (degree).

In the longitudinal aberration diagram, a spherical aberration is drawn in a scale of 0.4 mm, astigmatism is drawn in a scale of 0.4 mm, distortion is drawn in a scale of 10%, and a lateral chromatic aberration is drawn in a scale of 0.1 mm. In the lateral aberration diagram, lateral aberrations in a meridional direction (a solid line) and a sagittal direction (a dotted line) at image heights of 0 mm, 6 mm and 15.55 mm are shown. The lateral aberration diagram is drawn in a scale of 0.1 mm. In respective embodiments described below, the wide-angle end and the telephoto end indicate zoom positions at the time when the second lens unit U2 for magnification-varying is located at both ends of the movable range on the optical axis with respect to the mechanism. Characteristic of the lens configuration in the respective embodiments are described below.

The zoom lens in the respective embodiments includes, in order from the object side to the image side, the first lens unit U1 having positive refractive power that does not move for zooming and the second lens unit U2 having negative refractive power that moves during zooming. The zoom lens further includes the third lens unit U3 having positive refractive power that moves to correct variation of an image plane caused by zooming and a fourth lens unit U4 having positive refractive power that does not move for zooming. The fourth lens unit U4 includes a 41 lens group U41 and a 42 lens group U42 in order from the object side to the image side across a longest air interval in the fourth lens unit U4.

Further, the 41 lens group U41 includes a 411 lens group U411 and a 412 lens group U412 in order from the object side to the image side across a longest air interval Ld41 in the 41 lens group U41.

A lens surface on a most image side of the 411 lens unit U411 has a shape convex to the image side. A lens surface on a most object side of the 412 lens group U412 has a shape concave to the object side. When a curvature radius of the lens surface on the most image side of the 411 lens group U411 is represented as r411, a curvature radius of the lens surface on the most object side of the 412 lens group U412 is represented as r412, the zoom lens is focused on the infinite object, and lateral magnification of the third lens unit U3 at the wide-angle end is represented as β3w, the zoom lens satisfies the following conditions:

$$-0.7 < 1/\beta 3w < 0.5 \quad (1)$$

$$-0.30 < Ld41/r411 < -0.02 \quad (2)$$

$$-0.30 < Ld41/r412 < -0.02 \quad (3)$$

$$0.5 < r411/r412 < 1.5 \quad (4)$$

As described above, in the zoom lens according to the present invention, a lens surface having high refractive power is necessary to generate a high-order aberration in the fourth lens unit to balance aberration variation caused by zooming. In a zoom lens having a angle of shooting field of about 90°, variation of coma aberration is large in zooming, in particular, at an angle of field with low image height.

According to an aberration theory, coma aberration is proportional to a cube of incidence height h from an optical axis of a paraxial marginal ray and proportional to incidence height hbar from the optical axis of a paraxial off-axis principal ray. In the fourth lens unit U4, the incidence height h of the paraxial marginal ray is larger and the incidence height hbar of the paraxial off-axis principal ray is smaller in a position closer to the aperture stop SP. Therefore, it is desirable to provide a plane subject to a high-order aberration in a position closer to the aperture stop SP. Conversely, if the plane subject to a high-order aberration is provided in a position distant from the aperture stop SP, the curvature of the lens surface needs to be intensified by a decrease in the incidence height h of the paraxial marginal ray. However, sensitivity increases to make it difficult to manufacture the zoom lens.

Therefore, it is considered reasonable to provide the plane subject to a high-order aberration in the 41 lens group U41 close to the aperture stop SP. In the respective embodiments, a lens surface satisfying the conditional expressions (2) to (4) is provided to generate a high-order aberration.

The conditional expression (1) relates to lateral magnification of the third lens unit U3 at the wide-angle end. The conditional expression (1) is an expression for realizing a reduction in size and weight of the entire lens system. When the 1/β3w satisfies the conditional expression, since an emitted light beam from the third lens unit U3 becomes substantially afocal, the number of lenses included in the fourth lens unit U4 can be reduced. This is effective for a reduction in size and weight of the entire system. When the 1/β3w is equal to or greater than an upper limit of the conditional expression (1), divergence of the emitted light beam from the third lens unit U3 is intensified and a lens unit having high positive refractive power for focusing the light beam on the object side of the fourth lens unit U4 is necessary. Therefore, it is difficult to reduce the size and the weight of the entire system.

Conversely, when the 1/β3w is equal to or smaller than a lower limit of the conditional expression (1), convergence of the emitted light beam from the third lens unit U3 is intensified and a lens unit having high negative refractive power for securing an appropriate exit pupil and an appropriate F number is necessary on the object side of the fourth lens unit U4. Therefore, it is difficult to reduce the size and the weight of the entire system. Further, it is desirable to set a numerical value range of the conditional expression (1) as follows:

$$-0.4 < 1/\beta 3w < 0.2 \quad (1a)$$

The conditional expression (2) specifies a ratio the longest air interval Ld41 in the 41 lens group U41 and a curvature radius of the lens surface on the most image side of the 411 lens group. Similarly, the conditional expression (3) specifies a ratio of the longest air interval Ld41 in the 41 lens group and a curvature radius of the lens surface on the most image side of the 412 lens group.

Signs of the numerical value ranges of the conditional expressions (2) and (3) are also negative. This represents that a convex surface of the lens surface on the most image side of the 411 lens group U411 is faced to the image side and a concave surface of the lens surface on the most object side of the 412 lens group U412 is faced to the object side. With this configuration, a light beam converged on the convex surface on the most image side of the 411 lens group U411 is intensely diverged on the concave surface on the most object side of the 412 lens group U412 arranged near the 411 lens group U411. Therefore, it is possible to effectively generate a high-order aberration.

When the Ld41/r411 is equal to or greater than the upper limit of the conditional expression (2) and the Ld41/r412 is equal to or greater than the upper limit of the conditional expression (3), a generation amount of a high-order aberration decreases and a suppressing effect for aberration variation decreases. Therefore, it is difficult to attain satisfactory optical performance. When the Ld41/r411 is equal to or smaller than the lower limit of the conditional expression (2) and the Ld41/r412 is equal to or smaller than the lower limit of the conditional expression (3), sensitivity increases and aberration variation due to a manufacturing error increases to make it difficult to manufacture the zoom lens. It is more desirable to set the numerical value ranges of the conditional expressions (2) and (3) as follows:

$$-0.15 < d41/r411 < -0.03 \quad (2a)$$

$$-0.100 < d41/r412 < -0.025 \quad (3a)$$

The conditional expression (4) specifies a ratio of the curvature radius of the lens surface on the most image side of the 411 lens group U411 and the curvature radius of the lens surface on the most object side of the 412 lens group U412.

The two lens surfaces having high refractive power arranged close to each other have the similar degrees of curvatures with the same sign to make it easy to generate a high-order aberration while suppressing a low-order aberration. Therefore, the numerical value range of the conditional expression (4) is desirably in the vicinity of 1.0. If the numerical value range of the conditional expression (4) is not satisfied, it is difficult to effectively generate a high-order aberration and attain satisfactory optical performance. It is more desirable to set the numerical range of the conditional expression (4) as follows:

$$0.6 < r411/r412 < 1.4 \quad (4a)$$

As described above, according to the embodiments, it is possible to obtain a zoom lens has a wide angle of field and a high zoom ratio, has high optical performance over the entire zoom range, and can be easily manufactured.

In the embodiments, it is more desirable that the zoom lens satisfies one or more of conditions described below. A focal length of the first lens unit U1 corresponds to f1, a focal length of the second lens unit U2 corresponds to f2, and a focal length of the third lens unit U3 corresponds to f3. The 42 lens group U42 includes one or more positive lenses and one or more negative lenses. An average value of Abbe constants and an average value of partial dispersion ratios of materials of the one or more positive lenses of the 42 lens group U42 are respectively represented as ν42p and θ42p. An average value of Abbe constants and an average value of partial dispersion ratios of materials of the one or more negative lenses of the 42 lens group U42 are respectively represented as ν42n and θ42n. An average value of refractive indexes of the materials of the one or more negative lenses of the 42 lens group U42 is represented as n42n.

In this case, it is desirable that the zoom lens satisfies one or more of the following conditional expressions:

$$-2.20 < f1/f2 < -1.00 \quad (5)$$

$$-0.50 < f2/f3 < -0.25 \quad (6)$$

$$-2.5 \times 10^{-3} < (\theta 42p - \theta 42n)/(\nu 42p - \nu 42n) < -1.0 \times 10^{-3} \quad (7)$$

$$1.75 < n42n < 2.20 \quad (8)$$

Note that, when only one positive lens (negative lens) is included, the average value of the Abbe constants and the average value of the partial dispersion ratios are values of a material of the one positive lens (negative lens).

A technical meaning of the conditional expressions described above is described below. The conditional expression (5) specifies a ratio of focal lengths of the first lens unit U1 and the second lens unit U2. When the f1/f2 satisfies the conditional expression (5), the focal length of the first lens unit U1 with respect to the second lens unit U2 is appropriately set to efficiently realize satisfactory optical performance while realizing an increase in an angle of field and a reduction in size and weight of the entire system. When the f1/f2 is equal to or greater than the upper limit of the conditional expression (5), aberration correction on the telephoto side of the first lens unit U1 is insufficient and refractive power (an inverse of the focal length) necessary for magnification-varying of the second lens unit U2 is insufficient. Therefore, it is difficult to obtain high optical performance while realizing a reduction in size and weight of the entire system.

Conversely, when the f1/f2 is equal to or smaller than the lower limit of the conditional expression (5), since refractive power of the first lens unit U1 is insufficient, it is difficult to increase an angle of field and a reduction in size and weight of the entire system. Further, it is desirable to set a numerical value range of the conditional expression (5) as follows:

$$-2.00 < f1/f2 < -1.20 \quad (5a)$$

The conditional expression (6) specifies a ratio of focal lengths of the second lens unit U2 and the third lens unit U3. When the f2/f3 satisfies the conditional expression (6), the focal length of the second lens unit U2 with respect to the third lens unit U3 is appropriately set to efficiently realize satisfactory optical performance while realizing an increase in an angle of field and a reduction in size and weight of the entire system. When the f2/f3 is equal to or greater than the upper limit of the conditional expression (6), aberration variation of the second lens unit U2 caused by magnification-varying increases and it is difficult to obtain satisfactory optical performance in the entire zoom range. Alternatively, since refractive power of the third lens unit U3 is insufficient, a movement amount of the third lens unit for image plane correction caused by magnification-varying increases. As a result, it is difficult to reduce size and weight of the entire system.

Conversely, when the f2/f3 is equal to or smaller than the lower limit of the conditional expression (6), refractive force necessary for magnification-varying of the focal length of the second lens unit U2 is insufficient. Therefore, it is difficult to reduce the size and the weight of the entire system. Further, it is desirable to set a numerical value range of the conditional expression (6) as follows:

$$-0.50 < f2/f3 < -0.30 \quad (6a)$$

FIG. 12 is a schematic diagram concerning achromatism for two colors and remaining of a secondary spectrum in a lateral chromatic aberration due to the lens unit LP having positive refractive power present between the aperture stop SP and the image plane I. FIG. 13 is a schematic diagram of a distribution of the Abbe constant ν and the partial dispersion ratio θ of an existing optical material. The Abbe constant ν and the partial dispersion ratio θ are represented as follows when a refractive index on a g line is represented as Ng, a refractive index on an F line is represented as NF, a refractive index on a d line is represented as Nd, and a refractive index on a C line is represented as NC:

$$\nu = (Nd-1)/(NF-NC) \quad (A)$$

$$\theta = (Ng-NF)/(NF-NC) \quad (B)$$

As shown in FIG. 13, the partial dispersion ratio θ is distributed in a narrow range with respect to the Abbe constant ν in the existing optical element. As the Abbe constant ν is smaller, the partial dispersion ratio θ tends to be larger.

A correction condition for a chromatic aberration of a thin system (having combined refractive power φ) including two lenses G1 and G2, refractive powers of which are φ1 and φ2 and Abbe constants of materials of which are ν1 and ν2, is represented as follows:

$$\phi 1/\nu 1 + \phi 2/\nu 2 = E \quad (C)$$

where $$\phi = \phi 1 + \phi 2 \quad (D)$$

In Expression (C), when E=0, focusing positions on the C line and the F line match.

In FIG. 12, in the achromatism of the lens unit LP having positive refractive power, a material having a large Abbe constant ν1 is used as a material of the positive lens G1 and a material having a small Abbe number ν2 is used as a material of the negative lens G2. Therefore, the material of the positive lens G1 have a smaller partial dispersion ratio θ1 and the material of the negative lens G2 have a larger partial dispersion ratio θ2 than those in FIG. 13. When chromatic aberrations are corrected on the F line and the C line, an image point on the g line shifts in a direction away from the optical axis. When an amount of the shift is defined as a secondary spectrum amount Δ, the amount of the shift is represented as follows:

$$\Delta = -(1/\phi) \cdot (\theta 1 - \theta 2)/(\nu 1 - \nu 2) \quad (E)$$

In the zoom lens, in order to keep a balance of variation of a secondary spectrum of the lateral chromatic aberration during zooming, usually, in a zoom position at the wide-angle end, image points on the g line and the C line are shifted in a direction away from the optical axis with respect to an image point on the e line. However, in particular, in a wide-angle zoom lens, it is more likely that the secondary spectrum of the lateral chromatic aberration at the wide-angle end tends to be insufficiently corrected.

Therefore, in the fourth lens unit U4 present further on the image side than the aperture stop SP, a glass material for reducing the secondary spectrum amount Δ is selected for a lens unit having positive refractive power and a glass material for increasing the secondary spectrum amount Δ is selected for a lens unit having negative refractive power. Consequently, it is possible to effectively correct the secondary spectrum of the lateral chromatic aberration at the wide-angle end.

The conditional expression (7) is a condition specified taking into account the above points and, in particular, a condition for appropriately correcting the secondary spectrum of the lateral chromatic aberration at the wide-angle end. Since the 42 lens group U42 is a lens unit having positive refractive power, when the secondary spectrum amount Δ of Expression (E) is reduced as described above, it is easy to correct the secondary spectrum of the lateral chromatic aberration at the wide-angle end.

When the (θ42p−θ42n)/(ν42p−ν42n) is equal to or greater than the upper limit of the conditional expression (7), the secondary spectrum amount Δ decreases and it is easy to correct the secondary spectrum of the lateral chromatic aberration at the wide-angle end. However, it is difficult to correct the secondary spectrum of the lateral chromatic aberration at the telephoto end. When the (θ42p−θ42n)/(ν42p−ν42n) is equal to or smaller than the a lower limit of the conditional expression (7), the secondary spectrum amount Δ increases and it is difficult to correct the secondary spectrum of the lateral chromatic aberration at the wide-angle end. Further, it is desirable to set a numerical value range of the conditional expression (7) as follows:

$$-2.0 \times 10^{-3} < (\theta 42p - \theta 42n)/(\nu 42p - \nu 42n) < -1.3 \times 10^{-3} \quad (7a)$$

When the n42n is equal to or smaller than the lower limit of the conditional expression (8), refractive power increases in one negative lens and, in particular, off-axis aberrations are deteriorated at the wide-angle end. Therefore, the number of negative lenses has to be increased in order to attain satisfactory optical performance. This is undesirable because the number of constituent lenses increases.

When the n42n is equal to or greater than the upper limit of the conditional expression (8), a Petzval sum increases and it is difficult to satisfactorily correct curvature of field and astigmatism. It is more desirable to set a numerical range of the conditional expression (8) as follows:

$$1.90 < n42n < 2.50 \quad (8a)$$

In the embodiments, it is desirable that the 411 lens group U411 includes one positive lens and the 412 lens group U412 includes a cemented lens formed by joining a positive lens and a negative lens in order from the object side to the image side.

Alternatively, it is desirable that the 411 lens group U411 includes two positive lenses and the 412 lens group U412 includes a cemented lens formed by joining a positive lens and a negative lens in order from the object side to the image side. Consequently, although the 41 lens group U41 includes a small number of constituent lenses, it is easy to effectively correct on-axis aberrations and obtain satisfactory optical performance. It is desirable that the 42 lens group U42 includes, in order from the object side to the image side, a positive lens and a cemented lens formed by joining a positive lens and a negative lens. Alternatively, it is desirable that the 42 lens group U42 includes, in order from the object side to the image side, a positive lens, a cemented lens formed by joining a positive lens and a negative lens, and a positive lens.

It is desirable that the 42 lens group U42 includes, in order from the object side to the image side, a positive lens, a positive lens and a cemented lens formed by joining a positive lens and a negative lens. Consequently, although the 42 lens group U42 includes a small number of constituent lenses, it is easy to correct off-axis aberrations, in particular, curvature of field and a lateral chromatic aberration at the wide-angle end and obtain satisfactory optical performance.

Characteristics of the lens configuration in the embodiments are described below. A specific lens configuration of the first embodiment of the present invention is described below with reference to FIG. 1. The zoom lens in the first embodiment includes, in order from the object side to the image side, the first lens unit U1 having positive refractive power that does not move for zooming and the second lens unit U2 having negative refractive power that moves during zooming. The zoom lens further includes the third lens unit U3 having positive refractive power for correcting image plane variation caused by zooming and the fourth lens unit U4 having positive refractive power that does not move for zooming.

In zooming from the wide-angle end to the telephoto end, the second lens unit U2 linearly moves to the image side. The third lens unit U3 substantially reciprocatingly moves while drawing a track convex to the image side. Refractive powers and paraxial arrangements of the respective lens units are set such that a light beam emitted from the third lens unit U3 becomes a substantially afocal light beam. Consequently, an increase in the number of constituent lenses of the fourth lens unit U4 is suppressed. Aberration sharing of the third lens unit U3 is fixed irrespective of zooming. Generation of an aberration in the entire zoom range is suppressed.

FIG. 14 is an optical path diagram of a zoom lens focused on an infinite object at the wide-angle end, in the intermediate zoom position and at the telephoto end. Light beams corresponding to image heights 0.00 mm, 6.00 mm and 15.55 mm are drawn by solid lines. Since an optical path of the fourth lens unit does not change according to zooming, the fourth lens unit has substantially equal aberration correction effects over the entire zoom range. Therefore, by providing a lens surface for generating a high-order aberration in the fourth lens unit, it is possible to correct aberration variation caused by zooming and keep a balance of high optical performance over the entire zoom range.

The zoom lens in this embodiment has large coma aberration variation caused by zooming. Therefore, aberration variation is kept in a well-balanced state over the entire zoom range by intentionally generating a high-order aberration in the 41 lens group U41. Specifically, a light beam converged on a last lens surface of the 411 lens group U411 in the 41 lens group U41 near the aperture stop SP is intensely diverged on a forefront lens surface of the 412 lens group U412 to generate a high-order coma aberration while suppressing a low-order aberration. Consequently, the coma aberration is corrected in a well-balanced state over the entire zoom range. The configuration described above is completely the same in embodiments 2 to 5 described below.

The lens configuration for effectively generating a high-order aberration described above is described in detail below with reference to a paraxial tracking value and an aberration coefficient value. The paraxial tracking value in the numerical embodiment 1 indicates height h from the optical axis of the paraxial marginal ray at the time when the zoom lens is focused on the infinite object at a wide end, angle α formed by the paraxial marginal ray and the optical axis, height hbar from the optical axis of the paraxial off-axis principal ray, and an angle αbar formed by the paraxial off-axis principal ray and the optical axis. A fifth-order coma aberration coefficient in the numerical embodiment 1 indicates the following respective surface sharing values, i.e., surface sharing values of a fifth-order aberration coefficient II* (a circular coma aberration) related to a coma aberration at the time when the zoom lens is focused on the infinite object at the wide end, IIP (an arrow-like aberration), II^ (a peripheral coma aberration), IIz* (an additional aberration of the circular coma aberration) and IIz (a coma additional aberration).

A 34 surface and a 35 surface, which are the high-order aberration generating surfaces, are close to the aperture stop SP and have large h and small hbar. Therefore, the zoom lens has a lens configuration that can generate a high-order aberration while suppressing sensitivity.

Specifically, when aberration coefficients are compared, it is seen that five coma aberration coefficients are relatively large compared with other lens surfaces and a high-order coma aberration is effectively generated on the 34 $f$ surface and the 35 surface. Corresponding values of the respective conditional expressions in the first embodiment are shown in Table 1. The numerical embodiment 1 satisfies all the conditional expressions. The zoom lens that has a wide angle of field, a high zoom ratio, has high optical performance over the entire zoom range, and can be easily manufactured is realized.

A specific lens configuration in a second embodiment of the present invention is described below with reference to FIG. 3. A zoom lens in the second embodiment has a lens configuration same as the lens configuration in the first embodiment. In the second embodiment, a high-order coma aberration is intentionally generated in the 41 lens group U41 to keep aberration variation in a well-balanced state over the entire zoom range. A 33 surface and a 34 surface, which are high-order aberration generating surfaces, are close to the aperture stop SP and have large h and small hbar. Therefore, the zoom lens has a lens configuration that can generate a high-order aberration while suppressing sensitivity.

When aberration coefficients are compared, it is seen that five coma aberration coefficients of the 33 surface and the 34 surface are relatively large compared with other lens surfaces and a high-order coma aberration is effectively generated on the 33 surface and the 34 surface. Corresponding values of the respective conditional expressions in the second embodiment are shown in Table 1. The numerical embodiment 2 satisfies all the conditional expressions. The zoom lens that has a wide angle of field, a high zoom ratio, has high optical performance over the entire zoom range, and can be easily manufactured is realized.

Hereinafter, a specific lens configuration in a third embodiment of the present invention is described with reference to FIG. 5. A zoom lens in the third embodiment has a lens configuration same as the lens configuration in the first embodiment. In the third embodiment, a high-order coma aberration is intentionally generated in the 41 lens group U41 to keep aberration variation in a well-balanced state over the entire zoom range. A 32 surface and a 33 surface, which are high-order aberration generating surfaces, are close to the aperture stop SP and have large h and small hbar. Therefore, the zoom lens has a lens configuration that can generate a high-order aberration while suppressing sensitivity.

When aberration coefficients are compared, it is seen that five coma aberration coefficients of the 32 surface and the 33 surface are relatively large compared with other lens surfaces and a high-order coma aberration is effectively generated on the 32 surface and the 33 surface. Corresponding values of the respective conditional expressions in the third embodiment are shown in Table 1. The numerical embodiment 3 satisfies all the conditional expressions. The zoom lens that has a wide angle of field, a high zoom ratio, has high optical performance over the entire zoom range, and can be easily manufactured is realized.

Hereinafter a specific lens configuration in a fourth embodiment of the present invention is described with reference to FIG. 7. A zoom lens in the fourth embodiment has a lens configuration same as the lens configuration in the first embodiment. In the fourth embodiment, a high-order coma aberration is intentionally generated in the 41 lens group U41 to keep aberration variation in a well-balanced state over the entire zoom range. A 32 surface and a 33 surface, which are high-order aberration generating surfaces, are close to the aperture stop SP and have large h and small hbar. Therefore, the zoom lens has a lens configuration that can generate a high-order aberration while suppressing sensitivity.

When aberration coefficients are compared, it is seen that five coma aberration coefficients of the 32 surface and the 33 surface are relatively large compared with other lens surfaces and a high-order coma aberration is effectively generated on the 32 surface and the 33 surface. Corresponding values of the respective conditional expressions in the fourth embodiment are shown in Table 1. The numerical embodiment 4 satisfies all the conditional expressions. The zoom lens that has a wide angle of field, a high zoom ratio, has high optical performance over the entire zoom range, and can be easily manufactured is realized.

Hereinafter a specific lens configuration in a fifth embodiment of the present invention is described with reference to FIG. 9. A zoom lens in the fifth embodiment has a lens configuration same as the lens configuration in the first embodiment. In the fifth embodiment, a high-order coma aberration is intentionally generated in the 41 lens group U41 to keep aberration variation in a well-balanced state over the entire zoom range. A 32 surface and a 33 surface, which are high-order aberration generating surfaces, are close to the aperture stop SP and have large h and small hbar. Therefore, the zoom lens has a lens configuration that can generate a high-order aberration while suppressing sensitivity.

When aberration coefficients are compared, it is seen that five coma aberration coefficients of the 32 surface and the 33 surface are relatively large compared with other lens surfaces and a high-order coma aberration is effectively generated on the 32 surface and the 33 surface. Corresponding values of the respective conditional expressions in the fifth embodiment are shown in Table 1. The numerical embodiment 5 satisfies all the conditional expressions. The zoom lens that has a wide angle of field, a high zoom ratio, has high optical performance over the entire zoom range, and can be easily manufactured is realized.

FIG. 11 is a main part schematic diagram of an image pickup apparatus in which the zoom lens according to any one of the first to fifth embodiments is used as an image taking optical system. In FIG. 11, the image pickup apparatus includes a zoom lens 101 according to any one of the first to fifth embodiments and a camera (a camera main body) 124. The zoom lens 101 is removably attached to the camera 124. An image pickup apparatus 125 is set up by attaching the zoom lens 101 to the camera 124. The zoom lens 101 includes a focusing unit F, a magnification-varying unit LZ and an imaging unit R. The focusing unit F includes the first lens unit U1.

The magnifying unit LZ includes the second lens unit U2 that moves for magnification-varying on an optical path and the third lens unit U3 that moves on the optical axis to correct image plane variation caused by the magnification-varying. The focusing unit R includes the fourth lens unit U4. The aperture stop is indicated by SP. Driving mechanisms 114 and 115 such as helicoids or cams respective drive the focusing unit F and the magnifying unit LZ in the optical axis direction.

Motors (driving means) 116 to 118 electrically drive the driving mechanisms 114 and 115 and the aperture stop SP. Detectors 119 to 121 such as encoders, potentiometers, or photo-sensors detect positions on the optical axis of the focusing unit F and the magnification-varying unit LZ and a stop diameter of the aperture stop SP. The camera 124 includes a glass block 109 equivalent to an optical filter in the camera 124 and a solid-state image pickup device (a photo-electric conversion device) 110 such as a CCD sensor or a CMOS sensor receives an object image formed by the zoom lens 101.

CPUs (control means) 111 and 122 control various kinds of driving of the camera 124 and the zoom lens 101. The zoom lens according to the present invention is applied to the image pickup apparatus in this way, whereby the image pickup apparatus having high optical performance is realized.

The exemplary embodiments of the present invention are described above. However, it goes without saying that the present invention is not limited to embodiments. Various modifications and alterations are possible within the spirit of the present invention.

The numerical embodiments 1 to 5 corresponding to the first to fifth embodiments of the present invention are described below. In the numerical embodiments, i indicates an order of a surface from the object side, ri indicates a curvature radius of an ith surface from the object side, di indicates an interval between the ith surface and an (i+1)th surface from the object side, and ndi and vdi respectively indicate a refractive index and an Abbe constant of an ith optical member. An aspherical surface is indicated by * affixed to the side of a surface number. BF indicates a back focus in terms of the air.

An aspherical shape is represented by Expression 1 when an X axis is set in the optical axis direction, an H axis is set in a direction perpendicular to the optical axis, a traveling direction of light is represented as positive, a paraxial curvature radius is represented as R, a conic constant is represented as k, and aspherical surface coefficients are respective represented as A4, A6, A8, A10 and A12. "e−Z" means "×10$^{-z}$".

$$X = \frac{H^2/R}{1 + \sqrt{1 - (1+k)(H/R)^2}} + A4H^4 + A6H^6 + A8H^8 + A10H^{10} + A12H^{12}$$

Expression 1

Numerical Embodiment 1
Unit: mm

Surface data

| Surface number | r | d | nd | vd | θgF | Effective diameter | Focal length |
|---|---|---|---|---|---|---|---|
| 1* | 87.37875 | 2.50000 | 1.772499 | 49.60 | 0.5521 | 75.196 | −56.653 |
| 2 | 28.88694 | 16.98926 | 1.000000 | 0.00 | 0.0000 | 54.655 | 0.000 |
| 3 | 64.88511 | 2.00000 | 1.772499 | 49.60 | 0.5521 | 52.049 | −85.484 |
| 4 | 32.36354 | 18.21430 | 1.000000 | 0.00 | 0.0000 | 46.414 | 0.000 |
| 5 | −48.55500 | 2.00000 | 1.589130 | 61.14 | 0.5406 | 46.023 | −111.672 |
| 6 | −186.15062 | 1.48714 | 1.000000 | 0.00 | 0.0000 | 48.925 | 0.000 |
| 7 | 76.65460 | 5.53062 | 1.922860 | 18.90 | 0.6495 | 54.947 | 118.213 |
| 8 | 241.81400 | 4.03316 | 1.000000 | 0.00 | 0.0000 | 54.870 | 0.000 |
| 9 | 7501.56762 | 8.03149 | 1.487490 | 70.23 | 0.5300 | 55.223 | 136.128 |
| 10 | −67.15950 | 5.35422 | 1.000000 | 0.00 | 0.0000 | 55.406 | 0.000 |
| 11 | −698.61806 | 2.00000 | 1.846660 | 23.78 | 0.6205 | 52.108 | −51.335 |
| 12 | 46.89772 | 12.21675 | 1.487490 | 70.23 | 0.5300 | 51.126 | 71.498 |
| 13 | −125.77554 | 0.15000 | 1.000000 | 0.00 | 0.0000 | 51.528 | 0.000 |
| 14 | 119.72338 | 10.76171 | 1.496999 | 81.54 | 0.5374 | 52.098 | 80.231 |
| 15 | −58.25485 | 0.15000 | 1.000000 | 0.00 | 0.0000 | 51.953 | 0.000 |
| 16 | 49.09423 | 4.65563 | 1.772499 | 49.60 | 0.5521 | 44.059 | 98.680 |
| 17 | 131.06687 | (Variable) | 1.000000 | 0.00 | 0.0000 | 43.171 | 0.000 |
| 18 | 940.40239 | 1.20000 | 1.754998 | 52.32 | 0.5476 | 27.407 | −34.623 |
| 19 | 25.53204 | 5.05489 | 1.000000 | 0.00 | 0.0000 | 24.293 | 0.000 |
| 20 | −153.78698 | 1.20000 | 1.496999 | 81.54 | 0.5374 | 23.550 | −43.569 |
| 21 | 25.35392 | 5.17918 | 1.784696 | 26.29 | 0.6135 | 24.249 | 31.134 |
| 22 | −807.42657 | 3.34099 | 1.000000 | 0.00 | 0.0000 | 24.134 | 0.000 |
| 23 | −38.66629 | 1.20000 | 1.834000 | 37.16 | 0.5775 | 23.940 | −53.901 |
| 24 | −269.84396 | (Variable) | 1.000000 | 0.00 | 0.0000 | 24.578 | 0.000 |
| 25 | 140.01750 | 3.47530 | 1.729157 | 54.68 | 0.5444 | 25.537 | 77.600 |
| 26 | −94.64869 | 0.20000 | 1.000000 | 0.00 | 0.0000 | 25.770 | 0.000 |
| 27 | 62.49173 | 5.34354 | 1.496999 | 81.54 | 0.5374 | 25.771 | 51.621 |
| 28 | −42.49621 | 1.40000 | 1.882997 | 40.76 | 0.5667 | 25.486 | −70.473 |
| 29 | −134.42207 | (Variable) | 1.000000 | 0.00 | 0.0000 | 25.543 | 0.000 |
| 30 (Stop) | ∞ | 10.66109 | 1.000000 | 0.00 | 0.0000 | 24.013 | 0.000 |
| 31 | 5138.95284 | 2.18185 | 1.487490 | 70.23 | 0.5300 | 22.613 | 333.526 |
| 32 | −168.46876 | 1.00021 | 1.000000 | 0.00 | 0.0000 | 22.452 | 0.000 |
| 33 | −427.85124 | 6.21515 | 1.487490 | 70.23 | 0.5300 | 22.206 | 104.887 |
| 34 | −46.03027 | 1.99734 | 1.000000 | 0.00 | 0.0000 | 21.615 | 0.000 |
| 35 | −51.11294 | 2.59067 | 1.808095 | 22.76 | 0.6307 | 20.659 | 61.525 |
| 36 | −25.91132 | 1.20000 | 1.903660 | 31.32 | 0.5946 | 20.598 | −45.204 |
| 37 | −71.49214 | 9.10107 | 1.000000 | 0.00 | 0.0000 | 20.610 | 0.000 |
| 38 | 120.70558 | 3.67879 | 1.516330 | 64.14 | 0.5352 | 23.012 | 60.862 |
| 39 | −42.25532 | 0.19915 | 1.000000 | 0.00 | 0.0000 | 23.184 | 0.000 |
| 40 | 137.59124 | 4.42921 | 1.496999 | 81.54 | 0.5374 | 22.903 | 47.030 |
| 41 | −27.95375 | 1.20000 | 2.003300 | 28.27 | 0.5980 | 22.691 | −29.686 |
| 42 | −412.56090 | 40.89 | 1.000000 | 0.00 | 0.0000 | 23.121 | 0.000 |
| Image plane | ∞ | | | | | | |

Aspherical surface data
First surface

K = 0.00000e+000    A4 = 1.91933e−006    A6 = −4.70684e−010
A8 = 6.55219e−013    A10 = −3.76088e−016    A12 = 1.08912e−019

Various data
Zoom ratio 2.86

| | Wide angle | Intermediate | Telephoto |
|---|---|---|---|
| Focal length | 14.00 | 21.00 | 40.00 |
| F number | 2.79 | 2.79 | 2.80 |
| Half angle of field (degree) | 48.00 | 36.52 | 21.24 |
| Image height | 15.55 | 15.55 | 15.55 |
| Lens total length | 249.75 | 249.75 | 249.75 |
| BF | 40.89 | 40.89 | 40.89 |
| d17 | 2.12 | 16.74 | 27.74 |
| d24 | 28.77 | 21.50 | 1.94 |
| d29 | 9.84 | 2.50 | 11.06 |
| Entrance pupil position | 34.04 | 38.97 | 46.77 |
| Exit pupil position | −41.26 | −41.26 | −41.26 |
| Front principal point | 45.66 | 54.60 | 67.30 |
| Rear principal point | 26.89 | 19.89 | 0.89 |

-continued

Numerical Embodiment 1
Unit: mm

Zoom lens unit data

| Unit | Leading surface | Focal length | Lens configuration length | Front principal point | Rear principal point |
|---|---|---|---|---|---|
| 1 | 1 | 25.00 | 96.07 | 45.63 | 45.17 |
| 2 | 18 | −24.00 | 17.18 | 4.45 | −7.59 |
| 3 | 25 | 54.47 | 10.42 | 1.29 | −5.24 |
| 4 | 30 | 91.44 | 44.45 | 19.26 | −16.87 |

Paraxial tracking value (wide-angle end)

| Surface number | α | h | αbar | hbar |
|---|---|---|---|---|
| 1 | 0.0000 | 1.0000 | −1.0000 | −2.4315 |
| 2 | 0.1244 | 0.9875 | −1.3024 | −2.3006 |
| 3 | −0.2471 | 1.2874 | −0.4370 | −1.7703 |
| 4 | −0.0315 | 1.2899 | −0.7334 | −1.7113 |
| 5 | −0.4646 | 1.8944 | −0.1588 | −1.5047 |
| 6 | −0.7877 | 1.9651 | 0.0978 | −1.5135 |
| 7 | −0.7003 | 2.0395 | 0.0304 | −1.5167 |
| 8 | −0.3523 | 2.1114 | −0.2284 | −1.4700 |
| 9 | −0.4665 | 2.2458 | −0.1488 | −1.4272 |
| 10 | −0.4644 | 2.4247 | −0.1501 | −1.3693 |
| 11 | −0.2172 | 2.5078 | −0.2898 | −1.2585 |
| 12 | −0.2601 | 2.5278 | −0.2682 | −1.2379 |
| 13 | −0.5363 | 2.8421 | −0.1330 | −1.1599 |
| 14 | −0.3815 | 2.8462 | −0.1962 | −1.1578 |
| 15 | −0.2156 | 2.9568 | −0.2636 | −1.0226 |
| 16 | 0.1386 | 2.9553 | −0.3861 | −1.0184 |
| 17 | 0.7927 | 2.8069 | −0.6116 | −0.9039 |
| 18 | 0.5600 | 2.7221 | −0.5366 | −0.8228 |
| 19 | 0.5907 | 2.6934 | −0.5459 | −0.7961 |
| 20 | −0.5294 | 2.8845 | −0.2148 | −0.7186 |
| 21 | −0.6602 | 2.9223 | −0.1822 | −0.7082 |
| 22 | −0.1870 | 2.9609 | −0.2969 | −0.6469 |
| 23 | −0.1464 | 2.9958 | −0.3058 | −0.5739 |
| 24 | −1.0568 | 3.0450 | −0.1314 | −0.5678 |
| 25 | −0.9242 | 4.9444 | −0.1561 | −0.2470 |
| 26 | −0.5621 | 5.0249 | −0.1742 | −0.2220 |
| 27 | −0.0178 | 5.0252 | −0.1982 | −0.2192 |
| 28 | 0.5433 | 4.8868 | −0.2227 | −0.1625 |
| 29 | −0.0840 | 4.8912 | −0.2018 | −0.1518 |
| 30 | 0.3684 | 4.6322 | −0.2159 | 0.0000 |
| 31 | 0.3684 | 4.3516 | −0.2159 | 0.1644 |
| 32 | 0.3742 | 4.3125 | −0.2157 | 0.1870 |
| 33 | 0.5495 | 4.2732 | −0.2081 | 0.2018 |
| 34 | 0.4811 | 4.1298 | −0.2113 | 0.2648 |
| 35 | 1.0955 | 3.9735 | −0.1719 | 0.2893 |
| 36 | 0.2070 | 3.9524 | −0.2366 | 0.3134 |
| 37 | 0.0061 | 3.9521 | −0.2525 | 0.3248 |
| 38 | 0.7108 | 3.4901 | −0.1946 | 0.4513 |
| 39 | 0.9205 | 3.3308 | −0.1675 | 0.4803 |
| 40 | 1.4925 | 3.3095 | −0.0850 | 0.4815 |
| 41 | 1.6603 | 2.9590 | −0.0606 | 0.4943 |
| 42 | 0.8997 | 2.9206 | −0.1877 | 0.5023 |

Fifth-order coma aberration coefficient (wide-angle end)

| Surface number | II* | IIP | II^ | IIz* | IIz |
|---|---|---|---|---|---|
| 1 | 0.0370 | 0.2660 | 0.2440 | −0.0002 | −0.0380 |
| 2 | 0.0440 | −0.2300 | −0.2490 | 0.0430 | 0.1430 |
| 3 | 0.0390 | −0.0260 | 0.0270 | −0.0260 | 0.0180 |
| 4 | 0.4750 | −0.7690 | −1.2350 | 0.3360 | 0.5510 |
| 5 | 0.0700 | 0.0060 | 0.0560 | 0.1770 | −0.0790 |
| 6 | 0.1130 | 0.0750 | −0.0140 | −0.0160 | −0.0570 |
| 7 | −0.9900 | 0.8880 | 1.8000 | −0.7390 | −0.5770 |
| 8 | −0.0720 | 0.0710 | −0.0580 | 0.1130 | −0.0300 |
| 9 | 0.0510 | −0.0970 | −0.0430 | −0.0730 | 0.0450 |
| 10 | −0.0220 | −0.0110 | −0.0230 | 0.0330 | −0.0100 |
| 11 | −0.0190 | −0.0540 | −0.0460 | −0.0370 | 0.0240 |
| 12 | 0.5440 | −0.7140 | −1.4830 | 0.6180 | 0.4110 |
| 13 | −0.0320 | 0.0390 | 0.0230 | −0.0990 | 0.0130 |

Numerical Embodiment 1
Unit: mm

| | | | | | |
|---|---|---|---|---|---|
| 14 | 0.0440 | −0.0950 | 0.1460 | −0.0660 | 0.0330 |
| 15 | −0.1970 | 0.7780 | 1.1410 | −0.3690 | −0.4470 |
| 16 | 0.1540 | −0.0760 | −0.0450 | −0.0760 | 0.1550 |
| 17 | −0.0950 | 0.1490 | 0.1900 | −0.1480 | −0.0280 |
| 18 | 0.0940 | −0.6100 | −0.7670 | 0.3220 | 0.1890 |
| 19 | 0.7700 | −2.6790 | −8.0110 | 5.2830 | 1.3540 |
| 20 | 0.5210 | −0.2160 | −0.1520 | 1.2340 | 0.0240 |
| 21 | −2.6530 | 2.5730 | 7.0770 | −5.6250 | −1.3500 |
| 22 | −0.0490 | 0.0610 | 0.0430 | −0.0710 | 0.0020 |
| 23 | −0.4810 | −0.6740 | −0.9400 | 0.4360 | 0.3150 |
| 24 | −0.6630 | 0.7640 | 0.1010 | −0.0930 | −0.3460 |
| 25 | 3.3120 | −1.9550 | 2.6270 | −2.0850 | 0.9290 |
| 26 | −0.5660 | 0.4420 | 0.7550 | −0.8100 | −0.1820 |
| 27 | 0.1920 | −0.6740 | 0.3820 | −0.0690 | 0.3250 |
| 28 | 5.1780 | −3.2960 | −10.9080 | 11.9300 | 1.6810 |
| 29 | 2.1080 | 1.2300 | 2.2310 | −2.9450 | −0.4470 |
| 30 | 0.0000 | 0.0000 | 0.0000 | 0.0000 | 0.0000 |
| 31 | −0.4870 | −0.2620 | −0.3170 | 0.2580 | 0.0140 |
| 32 | 1.1570 | 0.8620 | 1.7840 | −2.2230 | −0.3590 |
| 33 | −0.8610 | −0.6080 | −1.0690 | 1.3150 | 0.2210 |
| 34 | −4.3120 | 2.2730 | 15.4050 | −11.0150 | −1.1230 |
| 35 | 2.7240 | −2.4270 | −15.2500 | 11.1970 | 1.1920 |
| 36 | −2.0310 | 0.2060 | −2.3800 | 1.2030 | −0.1040 |
| 37 | 1.5000 | 1.6000 | 5.6990 | −5.5410 | −0.7610 |
| 38 | −0.1510 | −0.2610 | −0.3350 | 0.4340 | 0.0610 |
| 39 | 13.4690 | −2.0490 | 13.6750 | 0.2080 | 1.0700 |
| 40 | 0.4260 | −1.1090 | −3.3780 | 6.4000 | 0.5470 |
| 41 | −21.0820 | 5.3080 | −9.2200 | −9.3300 | −2.7250 |
| 42 | −1.8600 | 1.1290 | 3.0020 | −0.0050 | −0.5800 |

Numerical Embodiment 2
Unit: mm

Surface data

| Surface number | r | d | nd | νd | θgF | Effective diameter | Focal length |
|---|---|---|---|---|---|---|---|
| 1* | 95.37749 | 2.85000 | 1.772499 | 49.60 | 0.5521 | 72.532 | −74.678 |
| 2 | 35.58322 | 21.12332 | 1.000000 | 0.00 | 0.0000 | 58.682 | 0.000 |
| 3 | −135.55338 | 2.00000 | 1.603001 | 65.44 | 0.5402 | 57.185 | −87.120 |
| 4 | 86.76814 | 7.91957 | 1.000000 | 0.00 | 0.0000 | 55.539 | 0.000 |
| 5 | 77.77528 | 5.06125 | 1.922860 | 18.90 | 0.6495 | 59.329 | 143.878 |
| 6 | 178.75533 | 3.55444 | 1.000000 | 0.00 | 0.0000 | 59.088 | 0.000 |
| 7 | 307.05210 | 8.69965 | 1.487490 | 70.23 | 0.5300 | 59.157 | 140.139 |
| 8 | −87.42857 | 2.00000 | 1.603001 | 65.44 | 0.5402 | 59.061 | −823.429 |
| 9 | −106.94506 | 9.83103 | 1.000000 | 0.00 | 0.0000 | 59.091 | 0.000 |
| 10 | 122.87201 | 5.66234 | 1.522494 | 59.84 | 0.5439 | 55.588 | 196.554 |
| 11 | −630.82928 | 0.20000 | 1.000000 | 0.00 | 0.0000 | 55.086 | 0.000 |
| 12 | −945.44474 | 2.00000 | 1.854780 | 24.80 | 0.6123 | 54.899 | −54.080 |
| 13 | 49.13627 | 11.65950 | 1.496999 | 81.54 | 0.5374 | 52.724 | 78.949 |
| 14 | −182.04012 | 0.20000 | 1.000000 | 0.00 | 0.0000 | 52.792 | 0.000 |
| 15 | 143.91871 | 5.50000 | 1.522494 | 59.84 | 0.5439 | 52.355 | 181.676 |
| 16 | −278.41578 | 0.20000 | 1.000000 | 0.00 | 0.0000 | 51.997 | 0.000 |
| 17 | 90.69667 | 6.85513 | 1.772499 | 49.60 | 0.5521 | 50.038 | 83.076 |
| 18 | −215.74820 | (Variable) | 1.000000 | 0.00 | 0.0000 | 49.122 | 0.000 |
| 19 | −668.92717 | 1.20000 | 1.589130 | 61.14 | 0.5406 | 25.781 | −42.061 |
| 20 | 25.85428 | 3.81622 | 1.000000 | 0.00 | 0.0000 | 22.615 | 0.000 |
| 21 | −94.64299 | 1.20000 | 1.516330 | 64.14 | 0.5352 | 22.217 | −34.665 |
| 22 | 22.27025 | 3.79165 | 1.755199 | 27.51 | 0.6103 | 20.631 | 32.605 |
| 23 | 199.79852 | 2.20808 | 1.000000 | 0.00 | 0.0000 | 20.275 | 0.000 |
| 24 | −36.14348 | 1.20000 | 1.589130 | 61.14 | 0.5406 | 20.212 | −46.960 |
| 25 | 121.41550 | (Variable) | 1.000000 | 0.00 | 0.0000 | 20.639 | 0.000 |
| 26 | 101.78909 | 3.31668 | 1.589130 | 61.14 | 0.5406 | 21.449 | 58.653 |
| 27 | −51.98522 | 0.20000 | 1.000000 | 0.00 | 0.0000 | 21.649 | 0.000 |
| 28 | 70.23678 | 4.07065 | 1.496999 | 81.54 | 0.5374 | 21.534 | 48.501 |
| 29 | −36.15321 | 1.40000 | 1.834000 | 37.16 | 0.5775 | 21.308 | −41.040 |
| 30 | 742.15054 | (Variable) | 1.000000 | 0.00 | 0.0000 | 21.317 | 0.000 |
| 31 (Stop) | ∞ | 16.62219 | 1.000000 | 0.00 | 0.0000 | 21.403 | 0.000 |
| 32 | 47.45502 | 6.79705 | 1.496999 | 81.54 | 0.5374 | 22.421 | 52.302 |
| 33 | −55.09592 | 1.99705 | 1.000000 | 0.00 | 0.0000 | 22.892 | 0.000 |
| 34 | −70.45188 | 3.85892 | 1.922860 | 18.90 | 0.6495 | 22.788 | 59.862 |
| 35 | −32.00287 | 1.20000 | 1.903660 | 31.32 | 0.5946 | 23.141 | −40.632 |

-continued

Numerical Embodiment 2
Unit: mm

| | | | | | | | |
|---|---|---|---|---|---|---|---|
| 36 | −241.42356 | 19.70630 | 1.000000 | 0.00 | 0.0000 | 23.531 | 0.000 |
| 37 | −66.18822 | 5.23555 | 1.516330 | 64.14 | 0.5352 | 26.389 | 676.012 |
| 38 | −57.17387 | 3.00014 | 1.000000 | 0.00 | 0.0000 | 27.555 | 0.000 |
| 39 | 161.97187 | 6.34333 | 1.496999 | 81.54 | 0.5374 | 28.126 | 44.732 |
| 40 | −25.51947 | 1.20000 | 2.001000 | 29.13 | 0.5997 | 28.147 | −42.648 |
| 41 | −64.17764 | 0.19825 | 1.000000 | 0.00 | 0.0000 | 29.387 | 0.000 |
| 42 | 58.74862 | 2.72778 | 1.496999 | 81.54 | 0.5374 | 30.148 | 188.322 |
| 43 | 154.59405 | 43.74 | 1.000000 | 0.00 | 0.0000 | 30.077 | 0.000 |
| Image plane | ∞ | | | | | | |

Aspherical surface data
First surface

K0 = 0.00000e+000  A4 = 3.89702e−007  A6 = 2.32971e−010
A8 = −1.16421e−013  A10 = 7.10643e−017  A12 = −1.36430e−020

Various data
Zoom ratio 4.00

| | Wide angle | Intermediate | Telephoto |
|---|---|---|---|
| Focal length | 20.00 | 40.00 | 80.00 |
| F number | 3.49 | 3.50 | 3.50 |
| Half angle of field (degree) | 37.87 | 21.24 | 11.00 |
| Image height | 15.55 | 15.55 | 15.55 |
| Lens total length | 276.37 | 276.37 | 276.37 |
| BF | 43.74 | 43.74 | 43.74 |
| d18 | 0.90 | 23.99 | 36.00 |
| d25 | 29.74 | 20.73 | 1.91 |
| d30 | 15.38 | 1.30 | 8.11 |
| Entrance pupil position | 46.62 | 65.95 | 90.07 |
| Exit pupil position | −96.16 | −96.16 | −96.16 |
| Front principal point | 63.76 | 94.52 | 124.32 |
| Rear principal point | 23.74 | 3.74 | −36.26 |

Zoom lens unit data

| Unit | Leading surface | Focal length | Lens configuration length | Front principal point | Rear principal point |
|---|---|---|---|---|---|
| 1 | 1 | 40.00 | 95.32 | 55.87 | 33.55 |
| 2 | 19 | −21.00 | 13.42 | 4.71 | −4.88 |
| 3 | 26 | 69.72 | 8.99 | −0.88 | −6.45 |
| 4 | 31 | 70.32 | 68.89 | 33.31 | −32.86 |

Paraxial tracking value (wide-angle end)

| Surface number | α | h | αbar | hbar |
|---|---|---|---|---|
| 1 | 0.0000 | 1.0000 | −1.0000 | −2.3309 |
| 2 | 0.1628 | 0.9869 | −1.3794 | −2.2202 |
| 3 | −0.2678 | 1.2698 | −0.4108 | −1.7864 |
| 4 | −0.3812 | 1.2935 | −0.2512 | −1.7708 |
| 5 | −0.5616 | 1.5159 | −0.0042 | −1.7691 |
| 6 | −0.1974 | 1.5418 | −0.4292 | −1.7129 |
| 7 | −0.3586 | 1.6055 | −0.2502 | −1.6685 |
| 8 | −0.3074 | 1.6953 | −0.3033 | −1.5799 |
| 9 | −0.3525 | 1.7173 | −0.2614 | −1.5636 |
| 10 | −0.1581 | 1.7950 | −0.4384 | −1.3481 |
| 11 | −0.0048 | 1.7959 | −0.5535 | −1.2453 |
| 12 | 0.0250 | 1.7956 | −0.5742 | −1.2396 |
| 13 | −0.0077 | 1.7960 | −0.5516 | −1.2100 |
| 14 | −0.2742 | 1.9027 | −0.3721 | −1.0652 |
| 15 | −0.1700 | 1.9044 | −0.4304 | −1.0609 |
| 16 | −0.0311 | 1.9100 | −0.5078 | −0.9693 |
| 17 | 0.0408 | 1.9096 | −0.5443 | −0.9639 |
| 18 | 0.3677 | 1.8387 | −0.7093 | −0.8270 |
| 19 | 0.5000 | 1.8162 | −0.7688 | −0.7925 |
| 20 | 0.4679 | 1.7986 | −0.7548 | −0.7640 |
| 21 | −0.3550 | 1.8663 | −0.4052 | −0.6867 |
| 22 | −0.5594 | 1.8884 | −0.3300 | −0.6737 |
| 23 | −0.1466 | 1.9042 | −0.4773 | −0.6223 |
| 24 | −0.2917 | 1.9364 | −0.4298 | −0.5748 |
| 25 | −0.9254 | 1.9713 | −0.2417 | −0.5657 |
| 26 | −1.1175 | 3.6329 | −0.1866 | −0.2883 |

-continued

Numerical Embodiment 2
Unit: mm

| | | | | |
|---|---|---|---|---|
| 27 | −0.6953 | 3.7054 | −0.2201 | −0.2654 |
| 28 | 0.1478 | 3.7039 | −0.2805 | −0.2626 |
| 29 | 0.6735 | 3.6124 | −0.3177 | −0.2194 |
| 30 | −0.0077 | 3.6127 | −0.2764 | −0.2089 |
| 31 | −0.0894 | 3.6815 | −0.2716 | 0.0000 |
| 32 | −0.0894 | 3.7558 | −0.2716 | 0.2258 |
| 33 | 0.6996 | 3.5971 | −0.2242 | 0.2766 |
| 34 | 1.3504 | 3.4622 | −0.1742 | 0.2940 |
| 35 | 0.4322 | 3.4191 | −0.2521 | 0.3191 |
| 36 | 0.4830 | 3.4040 | −0.2474 | 0.3269 |
| 37 | 0.7398 | 2.6750 | −0.2227 | 0.5464 |
| 38 | 0.3209 | 2.6197 | −0.3083 | 0.5995 |
| 39 | 0.7958 | 2.5003 | −0.1996 | 0.6295 |
| 40 | 0.9497 | 2.2993 | −0.1609 | 0.6635 |
| 41 | 0.0295 | 2.2984 | −0.4264 | 0.6762 |
| 42 | 0.7523 | 2.2910 | −0.2137 | 0.6784 |
| 43 | 1.1410 | 2.1871 | −0.0986 | 0.6873 |

Fifth-order coma aberration coefficient (wide-angle end)

| Surface number | II* | IIP | II$\hat{}$ | IIz* | IIz |
|---|---|---|---|---|---|
| 1 | −0.0520 | −0.2480 | −0.2660 | 0.0000 | −0.0090 |
| 2 | 0.2020 | −0.1620 | −0.2140 | 0.0530 | 0.2830 |
| 3 | 0.0130 | −0.0370 | −0.0130 | 0.0430 | −0.0590 |
| 4 | 0.3210 | −0.2560 | −0.3750 | 0.2130 | 0.2450 |
| 5 | −0.6470 | 0.4250 | 0.6280 | −0.3330 | −0.4100 |
| 6 | −0.0130 | 0.0250 | 0.0290 | 0.0320 | 0.0040 |
| 7 | 0.0160 | −0.0390 | −0.0480 | −0.0190 | 0.0100 |
| 8 | 0.0003 | −0.0020 | 0.0007 | −0.0010 | −0.0010 |
| 9 | −0.0020 | 0.0210 | 0.0000 | 0.0070 | 0.0180 |
| 10 | 0.0060 | −0.0590 | −0.0500 | −0.0004 | 0.0190 |
| 11 | −0.0050 | 0.0360 | 0.0220 | −0.0040 | 0.0300 |
| 12 | 0.0050 | −0.0420 | −0.0250 | 0.0030 | −0.0370 |
| 13 | 0.1740 | −0.2070 | −0.3180 | 0.1230 | 0.1310 |
| 14 | −0.0060 | 0.0460 | 0.0180 | −0.0250 | 0.0520 |
| 15 | 0.0240 | −0.0930 | −0.0750 | 0.0270 | 0.0140 |
| 16 | 0.0290 | 0.1130 | 0.0710 | 0.0020 | 0.0790 |
| 17 | 0.0290 | −0.0880 | −0.0750 | 0.0001 | 0.0080 |
| 18 | −0.0540 | 0.4740 | 0.4290 | −0.1730 | −0.0290 |
| 19 | 0.0400 | −0.2260 | −0.1740 | 0.0890 | −0.0410 |
| 20 | −0.7600 | −0.9260 | −1.9930 | 1.9160 | 0.3940 |
| 21 | 0.1690 | −0.1120 | −0.0310 | 0.5960 | −0.1070 |
| 22 | −3.2470 | 1.6540 | 2.9800 | −2.9280 | −0.9510 |
| 23 | −0.1420 | 0.2110 | 0.2330 | 0.2470 | −0.2610 |
| 24 | 0.2590 | 0.0970 | 0.0780 | −0.0550 | 0.2730 |
| 25 | −3.4080 | 0.4650 | −0.2480 | 3.1000 | −0.2220 |
| 26 | 13.0350 | −1.7000 | 0.6170 | −9.9300 | 0.8450 |
| 27 | −6.6150 | 1.7930 | 3.1300 | −6.4020 | −1.0950 |
| 28 | −0.5730 | −0.2450 | −0.2470 | −0.2930 | 0.3070 |
| 29 | 13.7900 | −4.2010 | −8.6460 | 19.7040 | 2.2460 |
| 30 | −0.1220 | 0.1840 | 0.1140 | −0.1690 | 0.1130 |
| 31 | 0.0000 | 0.0000 | 0.0000 | 0.0000 | 0.0000 |
| 32 | 7.0050 | −2.3290 | −1.4700 | 3.5240 | 1.1030 |
| 33 | 24.2050 | 1.6690 | 8.7160 | −28.9270 | −0.6820 |
| 34 | −21.6660 | −2.0620 | −8.3600 | 27.6690 | 0.8380 |
| 35 | 2.0960 | −0.0820 | 0.2140 | −0.7780 | 0.0460 |
| 36 | 2.7920 | 0.9550 | 1.5880 | −6.8190 | −0.2340 |
| 37 | −5.2300 | −0.3410 | −1.2900 | 4.9930 | 0.0300 |
| 38 | 7.2380 | −0.0720 | 1.1150 | −4.5040 | 0.1720 |
| 39 | 0.1260 | −0.2880 | −0.3780 | 3.0460 | 0.0040 |
| 40 | −31.6620 | 4.7960 | 2.1420 | −2.8930 | −2.7730 |
| 41 | −0.0270 | 0.0190 | 0.9580 | −0.9950 | −0.0190 |
| 42 | −0.0210 | −0.0090 | 0.0110 | −0.0700 | −0.0330 |
| 43 | −0.4440 | 0.4310 | 0.6560 | −0.0370 | −0.2220 |

Numerical Embodiment 3
Unit: mm

Surface data

| Surface number | r | d | nd | vd | θgF | Effective diameter | Focal length |
|---|---|---|---|---|---|---|---|
| 1* | 152.53568 | 2.50000 | 1.804000 | 46.57 | 0.5572 | 82.300 | −53.079 |
| 2 | 33.23387 | 21.92204 | 1.000000 | 0.00 | 0.0000 | 60.244 | 0.000 |
| 3 | −294.65548 | 1.80000 | 1.593490 | 67.00 | 0.5361 | 59.188 | −114.469 |
| 4 | 88.90575 | 2.00000 | 1.000000 | 0.00 | 0.0000 | 55.920 | 0.000 |
| 5 | 114.88268 | 1.80000 | 1.593490 | 67.00 | 0.5361 | 55.666 | −147.616 |
| 6 | 49.51362 | 8.00000 | 1.000000 | 0.00 | 0.0000 | 53.610 | 0.000 |
| 7 | 59.30182 | 5.18614 | 1.717362 | 29.50 | 0.6048 | 57.544 | 180.255 |
| 8 | 104.81202 | 5.00000 | 1.000000 | 0.00 | 0.0000 | 57.249 | 0.000 |
| 9 | 445.83966 | 7.89573 | 1.487490 | 70.23 | 0.5300 | 57.643 | 139.973 |
| 10* | −80.41913 | 4.41178 | 1.000000 | 0.00 | 0.0000 | 57.834 | 0.000 |
| 11 | 64.95869 | 1.80000 | 1.854780 | 24.80 | 0.6123 | 54.500 | −90.181 |
| 12 | 34.95003 | 11.85352 | 1.438750 | 94.93 | 0.5343 | 50.893 | 82.937 |
| 13 | 746.93180 | 0.20000 | 1.000000 | 0.00 | 0.0000 | 50.729 | 0.000 |
| 14 | 83.43049 | 5.15893 | 1.496999 | 81.54 | 0.5374 | 50.501 | 195.252 |
| 15 | 572.40587 | 0.40000 | 1.000000 | 0.00 | 0.0000 | 50.055 | 0.000 |
| 16 | 59.12257 | 8.94584 | 1.589130 | 61.14 | 0.5406 | 48.393 | 65.899 |
| 17 | −107.93626 | (Variable) | 1.000000 | 0.00 | 0.0000 | 47.814 | 0.000 |
| 18 | −128.13466 | 1.20000 | 1.593490 | 67.00 | 0.5361 | 24.824 | −27.257 |
| 19 | 18.65497 | 5.50351 | 1.000000 | 0.00 | 0.0000 | 20.673 | 0.000 |
| 20 | −35.09497 | 1.20000 | 1.438750 | 94.93 | 0.5343 | 20.148 | −65.818 |
| 21 | 167.08316 | 0.50000 | 1.000000 | 0.00 | 0.0000 | 19.577 | 0.000 |
| 22 | 37.48125 | 1.20000 | 1.438750 | 94.93 | 0.5343 | 19.245 | −242.074 |
| 23 | 27.45145 | 2.40000 | 1.805181 | 25.42 | 0.6161 | 19.510 | 66.279 |
| 24 | 53.79181 | (Variable) | 1.000000 | 0.00 | 0.0000 | 19.512 | 0.000 |
| 25 | 206.54541 | 1.40000 | 1.834000 | 37.16 | 0.5775 | 20.368 | −35.677 |
| 26 | 26.07217 | 4.84231 | 1.516330 | 64.14 | 0.5352 | 20.777 | 41.351 |
| 27 | −112.73214 | 0.20000 | 1.000000 | 0.00 | 0.0000 | 21.534 | 0.000 |
| 28 | 41.61518 | 3.09620 | 1.772499 | 49.60 | 0.5521 | 22.515 | 52.141 |
| 29 | −1425.61456 | (Variable) | 1.000000 | 0.00 | 0.0000 | 22.493 | 0.000 |
| 30 (Stop) | ∞ | 2.25353 | 1.000000 | 0.00 | 0.0000 | 22.121 | 0.000 |
| 31 | −97.13531 | 6.41148 | 1.496999 | 81.54 | 0.5374 | 22.059 | 86.771 |
| 32 | −30.58323 | 2.41245 | 1.000000 | 0.00 | 0.0000 | 22.308 | 0.000 |
| 33 | −35.46062 | 3.65410 | 1.808095 | 22.76 | 0.6307 | 21.362 | 52.186 |
| 34 | −20.24968 | 1.20000 | 1.882997 | 40.76 | 0.5667 | 21.600 | −41.095 |
| 35 | −46.75387 | 20.01291 | 1.000000 | 0.00 | 0.0000 | 22.054 | 0.000 |
| 36 | 769.20614 | 6.71955 | 1.487490 | 70.23 | 0.5300 | 27.360 | 124.057 |
| 37 | −65.69017 | 0.19753 | 1.000000 | 0.00 | 0.0000 | 28.664 | 0.000 |
| 38 | 76.59302 | 7.26118 | 1.487490 | 70.23 | 0.5300 | 29.204 | 41.316 |
| 39 | −26.59813 | 1.20000 | 1.805181 | 25.42 | 0.6161 | 29.182 | −26.237 |
| 40 | 109.64248 | 0.16378 | 1.000000 | 0.00 | 0.0000 | 30.612 | 0.000 |
| 41 | 45.90833 | 6.18671 | 1.516330 | 64.14 | 0.5352 | 31.905 | 54.955 |
| 42 | −71.57209 | 39.77 | 1.000000 | 0.00 | 0.0000 | 32.114 | 0.000 |
| Image plane | ∞ | | | | | | |

Aspherical surface data

First Surface

K = 0.00000e+000　　A4 = 1.97535e−006　　A6 = −5.16188e−010
A8 = 1.49560e−013　　A10 = 2.03100e−018　　A12 = −3.19604e−021

Tenth surface

K = 0.00000e+000　　A4 = 2.31269e−007　　A6 = −5.03317e−010
A8 = 8.88759e−013　　A10 = −1.17437e−015　　A12 = 5.19762e−019

Various data
Zoom ratio 2.29

| | Wide angle | Intermediate | Telephoto |
|---|---|---|---|
| Focal length | 14.00 | 21.00 | 32.00 |
| F number | 2.70 | 2.70 | 2.70 |
| Half angle of field (degree) | 48.00 | 36.52 | 25.92 |
| Image height | 15.55 | 15.55 | 15.55 |
| Lens total length | 239.44 | 239.44 | 239.44 |
| BF | 39.77 | 39.77 | 39.77 |
| d17 | 1.60 | 15.72 | 24.91 |
| d24 | 20.32 | 13.40 | 2.72 |
| d29 | 9.66 | 2.46 | 3.95 |
| Entrance pupil position | 34.33 | 39.92 | 45.39 |

-continued

Numerical Embodiment 3
Unit: mm

| | | | |
|---|---|---|---|
| Exit pupil position | −92.33 | −92.33 | −92.33 |
| Front principal point | 46.84 | 57.58 | 69.64 |
| Rear principal point | 25.77 | 18.77 | 7.77 |

Zoom lens unit data

| Unit | Leading surface | Focal length | Lens configuration length | Front principal point | Rear principal point |
|---|---|---|---|---|---|
| 1 | 1 | 29.50 | 88.87 | 46.07 | 38.08 |
| 2 | 18 | −23.50 | 12.00 | 1.47 | −7.97 |
| 3 | 25 | 62.00 | 9.54 | 5.58 | −0.21 |
| 4 | 30 | 60.62 | 57.67 | 34.23 | −13.70 |

Paraxial tracking value (wide-angle end)

| Surface number | α | h | αbar | hbar |
|---|---|---|---|---|
| 1 | 0.0000 | 1.0000 | −1.0000 | −2.4518 |
| 2 | 0.0742 | 0.9927 | −1.1819 | −2.3351 |
| 3 | −0.2638 | 1.4057 | −0.3869 | −1.7292 |
| 4 | −0.3035 | 1.4301 | −0.3380 | −1.7020 |
| 5 | −0.4377 | 1.4927 | −0.1784 | −1.6765 |
| 6 | −0.3293 | 1.5192 | −0.3000 | −1.6523 |
| 7 | −0.5852 | 1.8536 | −0.0218 | −1.6399 |
| 8 | −0.2688 | 1.9114 | −0.3017 | −1.5750 |
| 9 | −0.4534 | 2.0733 | −0.1496 | −1.5216 |
| 10 | −0.4215 | 2.2329 | −0.1730 | −1.4561 |
| 11 | −0.2314 | 2.3058 | −0.2970 | −1.3625 |
| 12 | 0.1975 | 2.2922 | −0.5504 | −1.3245 |
| 13 | −0.1910 | 2.4045 | −0.3259 | −1.1329 |
| 14 | −0.2108 | 2.4075 | −0.3166 | −1.1284 |
| 15 | −0.0094 | 2.4098 | −0.4109 | −1.0273 |
| 16 | −0.0388 | 2.4110 | −0.3984 | −1.0159 |
| 17 | 0.2988 | 2.2910 | −0.5407 | −0.7988 |
| 18 | 0.4746 | 2.2367 | −0.6020 | −0.7300 |
| 19 | 0.3290 | 2.2191 | −0.5545 | −0.7002 |
| 20 | −0.6629 | 2.4796 | −0.2415 | −0.6053 |
| 21 | −1.0980 | 2.5450 | −0.1353 | −0.5973 |
| 22 | −1.1918 | 2.5876 | −0.1132 | −0.5932 |
| 23 | −0.7666 | 2.6332 | −0.2107 | −0.5807 |
| 24 | −0.2660 | 2.6584 | −0.3211 | −0.5503 |
| 25 | −0.8283 | 3.8608 | −0.2047 | −0.2531 |
| 26 | −0.6086 | 3.8939 | −0.2191 | −0.2412 |
| 27 | −1.2799 | 4.1855 | −0.1775 | −0.2008 |
| 28 | −1.0106 | 4.1999 | −0.1904 | −0.1981 |
| 29 | 0.0861 | 4.1892 | −0.2422 | −0.1679 |
| 30 | 0.1181 | 4.1077 | −0.2434 | 0.0000 |
| 31 | 0.1181 | 4.0887 | −0.2434 | 0.0392 |
| 32 | −0.1757 | 4.1424 | −0.2463 | 0.1144 |
| 33 | 0.7695 | 4.0098 | −0.2201 | 0.1524 |
| 34 | −0.5230 | 4.0850 | −0.2693 | 0.1911 |
| 35 | −0.7255 | 4.1179 | −0.2787 | 0.2037 |
| 36 | 0.3697 | 3.5895 | −0.2246 | 0.5247 |
| 37 | 0.4016 | 3.4600 | −0.2199 | 0.5956 |
| 38 | 0.7623 | 3.4493 | −0.1578 | 0.5978 |
| 39 | 1.0707 | 3.0764 | −0.1043 | 0.6342 |
| 40 | 0.5469 | 3.0505 | −0.2123 | 0.6442 |
| 41 | 0.2304 | 3.0478 | −0.2792 | 0.6475 |
| 42 | 0.7120 | 2.8405 | −0.1768 | 0.6989 |

Fifth-order coma aberration coefficient (wide-angle end)

| Surface number | II* | IIP | II^ | IIz* | IIz |
|---|---|---|---|---|---|
| 1 | 0.0340 | 0.2100 | 0.1880 | −0.0001 | −0.0480 |
| 2 | 0.0090 | −0.2000 | −0.1830 | 0.0400 | 0.0960 |
| 3 | 0.0120 | −0.0620 | −0.0550 | 0.0100 | 0.0270 |
| 4 | −0.1060 | −0.0760 | −0.1260 | 0.1220 | 0.0320 |
| 5 | 0.1050 | 0.0210 | 0.0640 | −0.1050 | −0.0060 |
| 6 | 0.2690 | −0.7240 | −0.9770 | 0.5050 | 0.4370 |
| 7 | −0.3660 | 0.8140 | 1.1530 | −0.6330 | −0.4850 |
| 8 | −0.1380 | −0.0810 | −0.1700 | 0.1860 | 0.0400 |
| 9 | 0.0870 | −0.0800 | −0.0520 | −0.0690 | 0.0390 |

-continued

Numerical Embodiment 3
Unit: mm

| | | | | | |
|---|---|---|---|---|---|
| 10 | −0.5950 | −0.3160 | −0.3760 | 0.0360 | 0.0960 |
| 11 | 0.1050 | −0.0050 | 0.1030 | −0.1070 | 0.0070 |
| 12 | 0.3290 | −0.6030 | −0.9060 | 0.4100 | 0.3300 |
| 13 | −0.0200 | 0.0830 | 0.0640 | −0.0530 | 0.0030 |
| 14 | 0.0390 | −0.1190 | −0.0510 | 0.0130 | 0.0370 |
| 15 | −0.0100 | 0.0670 | 0.0350 | −0.0110 | 0.0580 |
| 16 | 0.0250 | −0.1240 | −0.0670 | 0.0270 | 0.0320 |
| 17 | −0.1630 | 1.0310 | 1.1230 | −0.5580 | −0.3340 |
| 18 | 0.1060 | −0.8910 | −0.9540 | 0.4650 | 0.2600 |
| 19 | 9.3250 | −3.4330 | −7.3280 | 5.5040 | 1.9750 |
| 20 | 0.4200 | −0.0640 | 0.0900 | 2.3500 | −0.2720 |
| 21 | −0.0520 | 0.4380 | −0.7470 | 0.6350 | −0.1860 |
| 22 | −4.6510 | 1.4470 | 5.2040 | −6.3590 | −0.8310 |
| 23 | −3.5350 | 1.2720 | 3.4130 | −2.9600 | −0.7090 |
| 24 | −1.1590 | 0.5420 | −1.1130 | 1.5660 | −0.2180 |
| 25 | 1.6950 | −1.4830 | −0.4810 | −0.5170 | 0.6720 |
| 26 | −7.1020 | −0.3620 | −10.8550 | 19.1250 | 0.2030 |
| 27 | −3.9230 | 0.6100 | 0.4420 | −6.5620 | −0.2240 |
| 28 | 22.4450 | −3.8160 | 5.1700 | −4.3050 | 1.8540 |
| 29 | 0.2090 | 0.1980 | 0.1310 | 0.0060 | 0.1360 |
| 30 | 0.0000 | 0.0000 | 0.0000 | 0.0000 | 0.0000 |
| 31 | −0.9170 | −0.4970 | −0.6260 | 1.1120 | 0.0980 |
| 32 | −18.1950 | 4.5330 | 13.9490 | −19.3020 | −2.3410 |
| 33 | 11.4020 | −4.0670 | −11.8590 | 16.1250 | 2.0780 |
| 34 | −0.3630 | −0.0730 | −1.4980 | 1.9720 | 0.0410 |
| 35 | 0.3200 | 1.8400 | 4.1660 | −6.7130 | −0.8950 |
| 36 | 0.0810 | −0.1890 | −0.2000 | 0.5270 | 0.0060 |
| 37 | 0.2980 | 0.2760 | 1.9380 | −1.6350 | −0.1250 |
| 38 | 0.5190 | −0.1270 | −0.1300 | 1.6710 | 0.0007 |
| 39 | −13.7640 | 3.7190 | −0.3720 | −3.0870 | −1.9120 |
| 40 | −0.0270 | −0.0330 | −0.0420 | 0.4570 | 0.0210 |
| 41 | 0.9370 | −0.1930 | −0.1080 | 0.0230 | 0.0700 |
| 42 | −0.4410 | −0.2670 | 1.5140 | 0.1800 | 0.1330 |

Numerical Embodiment 4
Unit: mm

Surface data

| Surface number | r | d | nd | vd | θgF | Effective diameter | Focal length |
|---|---|---|---|---|---|---|---|
| 1* | 94.01569 | 3.00000 | 1.772499 | 49.60 | 0.5521 | 76.209 | −64.097 |
| 2 | 32.08149 | 22.00000 | 1.000000 | 0.00 | 0.0000 | 57.483 | 0.000 |
| 3 | −207.77558 | 2.00000 | 1.603001 | 65.44 | 0.5402 | 55.606 | −111.778 |
| 4 | 100.67023 | 7.21946 | 1.000000 | 0.00 | 0.0000 | 52.893 | 0.000 |
| 5 | 817.07836 | 2.00000 | 1.772499 | 49.60 | 0.5521 | 51.824 | −54.284 |
| 6 | 40.02651 | 10.08909 | 1.805181 | 25.42 | 0.6161 | 51.186 | 62.910 |
| 7 | 163.57064 | 6.32372 | 1.000000 | 0.00 | 0.0000 | 51.047 | 0.000 |
| 8 | 559.20079 | 6.80390 | 1.487490 | 70.23 | 0.5300 | 52.346 | 176.086 |
| 9 | −101.40751 | 7.90856 | 1.000000 | 0.00 | 0.0000 | 52.831 | 0.000 |
| 10 | −2809.53668 | 2.00000 | 1.846660 | 23.78 | 0.6205 | 52.909 | −78.103 |
| 11 | 68.42954 | 12.08338 | 1.496999 | 81.54 | 0.5374 | 53.001 | 79.502 |
| 12 | −88.62346 | 0.20000 | 1.000000 | 0.00 | 0.0000 | 53.773 | 0.000 |
| 13 | 99.15962 | 13.71608 | 1.496999 | 81.54 | 0.5374 | 55.064 | 79.528 |
| 14 | −63.00426 | 0.40000 | 1.000000 | 0.00 | 0.0000 | 54.747 | 0.000 |
| 15 | 41.69430 | 5.86717 | 1.589130 | 61.14 | 0.5406 | 45.286 | 127.480 |
| 16 | 88.39957 | (Variable) | 1.000000 | 0.00 | 0.0000 | 43.545 | 0.000 |
| 17 | 144.26656 | 1.20000 | 1.804000 | 46.58 | 0.5572 | 23.372 | −36.258 |
| 18 | 24.26363 | 4.83826 | 1.000000 | 0.00 | 0.0000 | 20.871 | 0.000 |
| 19 | −40.33718 | 1.20000 | 1.487490 | 70.23 | 0.5300 | 20.019 | −49.702 |
| 20 | 61.79067 | 1.52410 | 1.000000 | 0.00 | 0.0000 | 19.786 | 0.000 |
| 21 | 40.37278 | 4.34628 | 1.846660 | 23.78 | 0.6205 | 20.693 | 33.327 |
| 22 | −92.05632 | 1.34578 | 1.000000 | 0.00 | 0.0000 | 20.643 | 0.000 |
| 23 | −36.54169 | 1.20000 | 1.804000 | 46.58 | 0.5572 | 20.537 | −35.691 |
| 24 | 138.88755 | (Variable) | 1.000000 | 0.00 | 0.0000 | 20.948 | 0.000 |
| 25 | 146.27770 | 1.40000 | 1.903660 | 31.32 | 0.5946 | 22.024 | −39.950 |
| 26 | 28.99740 | 4.29574 | 1.589130 | 61.14 | 0.5406 | 22.418 | 41.600 |
| 27 | −153.41661 | 0.20000 | 1.000000 | 0.00 | 0.0000 | 22.946 | 0.000 |
| 28 | 53.39657 | 3.72996 | 1.772499 | 49.60 | 0.5521 | 23.803 | 53.948 |
| 29 | −188.14663 | (Variable) | 1.000000 | 0.00 | 0.0000 | 23.871 | 0.000 |
| 30 (Stop) | ∞ | 2.00003 | 1.000000 | 0.00 | 0.0000 | 23.315 | 0.000 |
| 31 | 74.44004 | 4.61253 | 1.496999 | 81.54 | 0.5374 | 23.201 | 55.331 |

-continued

Numerical Embodiment 4
Unit: mm

| | | | | | | | |
|---|---|---|---|---|---|---|---|
| 32 | −42.90942 | 5.01874 | 1.000000 | 0.00 | 0.0000 | 22.921 | 0.000 |
| 33 | −41.63925 | 2.70181 | 1.922860 | 18.90 | 0.6495 | 20.249 | 46.950 |
| 34 | −22.03116 | 1.20000 | 1.903660 | 31.32 | 0.5946 | 20.246 | −29.516 |
| 35 | −125.44382 | 16.68035 | 1.000000 | 0.00 | 0.0000 | 20.199 | 0.000 |
| 36 | −127.33550 | 2.16299 | 1.487490 | 70.23 | 0.5300 | 24.480 | 240.323 |
| 37 | −61.46557 | 0.19875 | 1.000000 | 0.00 | 0.0000 | 24.883 | 0.000 |
| 38 | −803.84559 | 3.50099 | 1.487490 | 70.23 | 0.5300 | 25.163 | 84.477 |
| 39 | −39.35742 | 0.19419 | 1.000000 | 0.00 | 0.0000 | 25.383 | 0.000 |
| 40 | 54.40168 | 5.92777 | 1.496999 | 81.54 | 0.5374 | 24.958 | 37.607 |
| 41 | −27.56393 | 1.20000 | 2.003300 | 28.27 | 0.5980 | 24.592 | −27.954 |
| 42 | −1111.58535 | 40.01 | 1.000000 | 0.00 | 0.0000 | 24.943 | 0.000 |
| Image plane | ∞ | | | | | | |

Aspherical surface data
First surface

| | | |
|---|---|---|
| K = 0.00000e+000 | A4 = 1.07564e−006 | A6 = −4.49925e−011 |
| A8 = −2.37866e−017 | A10 = 2.77096e−017 | A12 = −4.33307e−021 |

Various data
Zoom ratio 3.00

| | Wide angle | Intermediate | Telephoto |
|---|---|---|---|
| Focal length | 15.00 | 30.00 | 45.00 |
| F number | 3.00 | 2.99 | 3.00 |
| Half angle of field (degree) | 46.03 | 27.40 | 19.06 |
| Image height | 15.55 | 15.55 | 15.55 |
| Lens total length | 250.55 | 250.55 | 250.55 |
| BF | 40.01 | 40.01 | 40.01 |
| d16 | 2.00 | 24.44 | 31.42 |
| d24 | 21.58 | 11.69 | 2.02 |
| d29 | 14.68 | 2.12 | 4.81 |
| Entrance pupil position | 38.65 | 49.53 | 55.90 |
| Exit pupil position | −42.84 | −42.84 | −42.84 |
| Front principal point | 50.93 | 68.67 | 76.46 |
| Rear principal point | 25.01 | 10.01 | −4.99 |

Zoom lens unit data

| Unit | Leading surface | Focal length | Lens configuration length | Front principal point | Rear principal point |
|---|---|---|---|---|---|
| 1 | 1 | 29.00 | 101.61 | 50.54 | 41.13 |
| 2 | 17 | −20.40 | 15.65 | 4.08 | −6.95 |
| 3 | 25 | 56.00 | 9.63 | 4.57 | −1.16 |
| 4 | 30 | 76.18 | 45.40 | 14.06 | −25.60 |

Paraxial tracking value (wide-angle end)

| Surface number | α | h | αbar | hbar |
|---|---|---|---|---|
| 1 | 0.0000 | 1.0000 | −1.0000 | −2.5767 |
| 2 | 0.1238 | 0.9861 | −1.3191 | −2.4282 |
| 3 | −0.2340 | 1.3293 | −0.4379 | −1.7860 |
| 4 | −0.2921 | 1.3535 | −0.3598 | −1.7561 |
| 5 | −0.4142 | 1.5529 | −0.2015 | −1.6591 |
| 6 | −0.3920 | 1.5823 | −0.2251 | −1.6422 |
| 7 | −0.3704 | 1.7198 | −0.2475 | −1.5504 |
| 8 | −0.4986 | 1.9300 | −0.1320 | −1.4947 |
| 9 | −0.4733 | 2.0741 | −0.1516 | −1.4485 |
| 10 | −0.3232 | 2.2445 | −0.2564 | −1.3133 |
| 11 | −0.3334 | 2.2685 | −0.2504 | −1.2953 |
| 12 | −0.5108 | 2.5431 | −0.1492 | −1.2151 |
| 13 | −0.2962 | 2.5470 | −0.2517 | −1.2118 |
| 14 | −0.1042 | 2.6106 | −0.3431 | −1.0024 |
| 15 | 0.2056 | 2.6051 | −0.4620 | −0.9901 |
| 16 | 0.7599 | 2.4183 | −0.6727 | −0.8248 |
| 17 | 0.5172 | 2.3493 | −0.5899 | −0.7461 |
| 18 | 0.7146 | 2.3177 | −0.6526 | −0.7172 |
| 19 | −0.4432 | 2.4607 | −0.2943 | −0.6223 |
| 20 | −0.8908 | 2.5085 | −0.1811 | −0.6126 |
| 21 | −1.1887 | 2.6293 | −0.1084 | −0.6016 |
| 22 | −0.3534 | 2.6845 | −0.2995 | −0.5548 |
| 23 | 0.0206 | 2.6827 | −0.3768 | −0.5210 |

Numerical Embodiment 4
Unit: mm

| | | | | |
|---|---|---|---|---|
| 24 | −0.8693 | 2.7211 | −0.2039 | −0.5120 |
| 25 | −1.1068 | 4.3132 | −0.1593 | −0.2829 |
| 26 | −0.7041 | 4.3476 | −0.1857 | −0.2738 |
| 27 | −1.4216 | 4.6035 | −0.1405 | −0.2485 |
| 28 | −1.1554 | 4.6189 | −0.1548 | −0.2465 |
| 29 | −0.1483 | 4.6396 | −0.2086 | −0.2173 |
| 30 | 0.1388 | 4.5038 | −0.2220 | 0.0000 |
| 31 | 0.1388 | 4.4853 | −0.2220 | 0.0296 |
| 32 | 0.5893 | 4.3643 | −0.2191 | 0.0746 |
| 33 | 1.3498 | 3.9127 | −0.2061 | 0.1435 |
| 34 | 0.0329 | 3.9096 | −0.2544 | 0.1672 |
| 35 | 0.0963 | 3.9056 | −0.2517 | 0.1777 |
| 36 | 0.5215 | 3.3257 | −0.2323 | 0.4361 |
| 37 | 0.3299 | 3.2937 | −0.2574 | 0.4610 |
| 38 | 0.7231 | 3.2842 | −0.2024 | 0.4637 |
| 39 | 0.6931 | 3.1755 | −0.2066 | 0.4961 |
| 40 | 1.2851 | 3.1589 | −0.1142 | 0.4975 |
| 41 | 1.7192 | 2.7055 | −0.0458 | 0.5096 |
| 42 | 0.9636 | 2.6672 | −0.1881 | 0.5171 |

Fifth-order coma aberration coefficient (wide-angle end)

| Surface number | II* | IIP | II^ | IIz* | IIz |
|---|---|---|---|---|---|
| 1 | 0.0130 | 0.1250 | 0.1080 | −0.0001 | −0.0250 |
| 2 | 0.0530 | −0.1860 | −0.2040 | 0.0330 | 0.1450 |
| 3 | 0.0080 | −0.0440 | −0.0310 | 0.0170 | −0.0070 |
| 4 | −0.0410 | −0.0370 | −0.0960 | 0.0700 | 0.0260 |
| 5 | 0.0380 | −0.0860 | −0.0640 | −0.0140 | 0.0360 |
| 6 | −0.0250 | 0.0410 | 0.0620 | −0.0240 | −0.0300 |
| 7 | −0.0950 | −0.0110 | −0.1080 | 0.1400 | 0.0110 |
| 8 | 0.0720 | −0.0710 | −0.0240 | −0.0630 | 0.0320 |
| 9 | −0.0130 | 0.0280 | 0.0060 | −0.0380 | 0.0200 |
| 10 | 0.0240 | −0.1170 | −0.0980 | 0.0270 | 0.0390 |
| 11 | 0.0120 | −0.2580 | −0.4680 | 0.2680 | 0.1400 |
| 12 | −0.0170 | 0.0210 | −0.0160 | −0.0730 | 0.0550 |
| 13 | 0.0760 | −0.0830 | 0.0380 | −0.0510 | 0.0300 |
| 14 | −0.0600 | 0.7520 | 0.9460 | −0.3440 | −0.3490 |
| 15 | 0.1640 | −0.0680 | −0.1110 | −0.0780 | 0.2010 |
| 16 | −0.0330 | −0.0230 | −0.0100 | −0.0580 | 0.0400 |
| 17 | 0.0370 | −0.1600 | −0.1540 | 0.1100 | −0.0380 |
| 18 | −3.5970 | −1.4570 | −4.2580 | 4.2160 | 0.5700 |
| 19 | −0.3160 | −0.0410 | 0.0990 | 0.8700 | −0.1680 |
| 20 | −5.9740 | −0.4670 | −3.7110 | 6.7880 | 0.2240 |
| 21 | 8.6270 | 2.2910 | 9.1450 | −13.3140 | −1.1200 |
| 22 | −0.3670 | 0.1110 | 0.1340 | −0.1440 | −0.0630 |
| 23 | 1.4390 | −1.1930 | −1.6940 | 1.3390 | 0.7200 |
| 24 | −2.9810 | 0.9830 | −1.1350 | 2.3970 | −0.4660 |
| 25 | 7.0050 | −2.3430 | 2.0840 | −4.7570 | 1.1340 |
| 26 | −1.0060 | −2.0020 | −21.5780 | 30.6390 | 1.0290 |
| 27 | −5.1430 | 1.0500 | 0.4210 | −8.3630 | −0.4420 |
| 28 | 21.3130 | −3.1910 | 11.5300 | −7.9770 | 1.5440 |
| 29 | 1.0750 | 0.4580 | 0.5200 | −0.7040 | 0.0003 |
| 30 | 0.0000 | 0.0000 | 0.0000 | 0.0000 | 0.0000 |
| 31 | 0.4000 | −0.4110 | −0.2160 | 0.6230 | 0.0470 |
| 32 | −23.5350 | 7.1180 | 26.7230 | −35.2040 | −3.5520 |
| 33 | 8.4290 | −6.5500 | −26.4180 | 34.2880 | 3.2080 |
| 34 | 1.0050 | 0.0370 | 0.9380 | −1.2230 | −0.0170 |
| 35 | 2.4750 | 1.2410 | 2.1860 | −3.8100 | −0.4460 |
| 36 | −1.3040 | −0.6320 | −1.1400 | 1.9920 | 0.2210 |
| 37 | 2.7560 | 0.7880 | 2.9470 | −4.5340 | −0.3320 |
| 38 | −0.6820 | −0.6200 | −1.0470 | 1.9490 | 0.2330 |
| 39 | 17.4520 | −1.7610 | 7.4600 | −3.7100 | 0.9630 |
| 40 | 1.6960 | −0.4880 | −0.6700 | 7.8080 | 0.1890 |
| 41 | −27.7860 | 6.1560 | −4.2130 | −9.0890 | −3.2230 |
| 42 | −1.4140 | 1.1230 | 2.2670 | 0.0190 | −0.5750 |

Numerical Embodiment 5
Unit: mm

Surface data

| Surface number | r | d | nd | vd | θgF | Effective diameter | Focal length |
|---|---|---|---|---|---|---|---|
| 1 | 51.92985 | 2.50000 | 1.772499 | 49.60 | 0.5521 | 69.341 | −95.435 |
| 2 | 29.88642 | 12.00219 | 1.000000 | 0.00 | 0.0000 | 55.123 | 0.000 |
| 3* | 52.13323 | 2.20000 | 1.772499 | 49.60 | 0.5521 | 53.239 | −96.168 |
| 4 | 30.12938 | 20.16506 | 1.000000 | 0.00 | 0.0000 | 47.468 | 0.000 |
| 5 | −52.82257 | 2.10000 | 1.593490 | 67.00 | 0.5361 | 46.261 | −67.196 |
| 6 | 167.61650 | 1.50077 | 1.000000 | 0.00 | 0.0000 | 48.935 | 0.000 |
| 7 | 78.33726 | 5.17223 | 1.959060 | 17.47 | 0.6599 | 52.349 | 107.691 |
| 8 | 301.30464 | 2.58694 | 1.000000 | 0.00 | 0.0000 | 52.358 | 0.000 |
| 9 | 341.97214 | 8.96281 | 1.487490 | 70.23 | 0.5300 | 52.807 | 111.680 |
| 10* | −64.45386 | 5.63644 | 1.000000 | 0.00 | 0.0000 | 52.972 | 0.000 |
| 11 | −180.84611 | 2.00000 | 1.846660 | 23.78 | 0.6205 | 50.448 | −45.895 |
| 12 | 50.37230 | 12.05738 | 1.487490 | 70.23 | 0.5300 | 50.358 | 75.029 |
| 13 | −124.58163 | 0.15000 | 1.000000 | 0.00 | 0.0000 | 51.124 | 0.000 |
| 14 | 153.55458 | 11.44869 | 1.496999 | 81.54 | 0.5374 | 52.494 | 82.562 |
| 15 | −54.82638 | 0.15000 | 1.000000 | 0.00 | 0.0000 | 52.797 | 0.000 |
| 16 | 53.05764 | 6.55555 | 1.772499 | 49.60 | 0.5521 | 47.945 | 88.820 |
| 17 | 217.84264 | (Variable) | 1.000000 | 0.00 | 0.0000 | 46.598 | 0.000 |
| 18 | 102.48573 | 1.30000 | 1.754998 | 52.32 | 0.5476 | 26.171 | −38.541 |
| 19 | 22.61954 | 4.91271 | 1.000000 | 0.00 | 0.0000 | 23.130 | 0.000 |
| 20 | −76.44908 | 1.30000 | 1.496999 | 81.54 | 0.5374 | 22.603 | −33.874 |
| 21 | 21.79356 | 4.79073 | 1.784696 | 26.29 | 0.6135 | 22.459 | 26.096 |
| 22 | −358.93378 | 2.62364 | 1.000000 | 0.00 | 0.0000 | 22.317 | 0.000 |
| 23 | −31.43554 | 1.30000 | 1.834000 | 37.16 | 0.5775 | 22.146 | −35.523 |
| 24 | 589.24300 | (Variable) | 1.000000 | 0.00 | 0.0000 | 22.914 | 0.000 |
| 25 | 320.70801 | 4.13842 | 1.729157 | 54.68 | 0.5444 | 24.412 | 50.618 |
| 26 | −41.68507 | 0.40000 | 1.000000 | 0.00 | 0.0000 | 24.866 | 0.000 |
| 27 | 46.30703 | 5.35843 | 1.496999 | 81.54 | 0.5374 | 24.621 | 41.318 |
| 28 | −35.66380 | 1.50000 | 1.834000 | 37.16 | 0.5775 | 24.273 | −38.397 |
| 29 | 340.90816 | (Variable) | 1.000000 | 0.00 | 0.0000 | 24.108 | 0.000 |
| 30 (Stop) | ∞ | 1.99042 | 1.000000 | 0.00 | 0.0000 | 23.871 | 0.000 |
| 31 | 80.68510 | 4.04751 | 1.496999 | 81.54 | 0.5374 | 23.814 | 57.165 |
| 32 | −43.31630 | 7.64423 | 1.000000 | 0.00 | 0.0000 | 23.644 | 0.000 |
| 33 | −31.57645 | 4.29802 | 1.808095 | 22.76 | 0.6307 | 19.981 | 74.029 |
| 34 | −22.00956 | 1.20000 | 1.816000 | 46.62 | 0.5568 | 20.168 | −38.760 |
| 35 | −73.29677 | 9.48483 | 1.000000 | 0.00 | 0.0000 | 20.332 | 0.000 |
| 36 | −42.54041 | 3.86902 | 1.487490 | 70.23 | 0.5300 | 21.801 | 157.548 |
| 37 | −28.22868 | 2.00209 | 1.000000 | 0.00 | 0.0000 | 23.044 | 0.000 |
| 38 | −158.21986 | 4.37862 | 1.487490 | 70.23 | 0.5300 | 23.957 | 113.965 |
| 39 | −41.59678 | 2.55485 | 1.000000 | 0.00 | 0.0000 | 24.561 | 0.000 |
| 40 | 109.40282 | 5.46894 | 1.496999 | 81.54 | 0.5374 | 24.576 | 40.942 |
| 41 | −24.67025 | 1.20000 | 2.003300 | 28.27 | 0.5980 | 24.464 | −35.667 |
| 42 | −79.89978 | 39.98 | 1.000000 | 0.00 | 0.0000 | 25.260 | 0.000 |
| Image plane | ∞ | | | | | | |

Aspherical surface data

Third surface

K = 0.00000e+000   A4 = 1.72134e−006   A6 = 1.57275e−009
A8 = −1.96194e−013   A10 = −4.85686e−017   A12 = 8.85842e−019

Tenth surface

K = 0.00000e+000   A4 = 3.04914e−007   A6 = 2.52809e−012
A8 = −2.08997e−013   A10 = −2.68841e−016   A12 = 2.73790e−019

Various data
Zoom ratio 3.03

| | Wide angle | Intermediate | Telephoto |
|---|---|---|---|
| Focal length | 16.50 | 25.00 | 50.00 |
| F number | 2.80 | 2.78 | 2.80 |
| Half angle of field (degree) | 43.30 | 31.88 | 17.28 |
| Image height | 15.55 | 15.55 | 15.55 |
| Lens total length | 251.89 | 251.89 | 251.89 |
| BF | 39.98 | 39.98 | 39.98 |
| d17 | 2.51 | 19.44 | 35.17 |
| d24 | 20.04 | 15.62 | 2.78 |
| d29 | 18.40 | 5.89 | 3.00 |
| Entrance pupil position | 41.30 | 48.56 | 61.97 |
| Exit pupil position | −54.46 | −54.46 | −54.46 |

-continued

Numerical Embodiment 5
Unit: mm

|  | | | |
|---|---|---|---|
| Front principal point | 54.92 | 66.95 | 85.50 |
| Rear principal point | 23.48 | 14.98 | −10.02 |

Zoom lens unit data

| Unit | Leading surface | Focal length | Lens configuration length | Front principal point | Rear principal point |
|---|---|---|---|---|---|
| 1 | 1 | 32.00 | 95.19 | 53.77 | 44.49 |
| 2 | 18 | −20.00 | 16.23 | 5.70 | −5.44 |
| 3 | 25 | 50.34 | 11.40 | −0.17 | −7.04 |
| 4 | 30 | 68.44 | 48.14 | 21.58 | −22.94 |

Paraxial tracking value (wide-angle end)

| Surface number | α | h | αbar | hbar |
|---|---|---|---|---|
| 1 | 0.0000 | 1.0000 | −1.0000 | −2.5032 |
| 2 | 0.2466 | 0.9790 | −1.6174 | −2.3652 |
| 3 | −0.1729 | 1.1047 | −0.6038 | −1.9260 |
| 4 | 0.0985 | 1.0973 | −1.0769 | −1.8452 |
| 5 | −0.3680 | 1.5470 | −0.2926 | −1.4876 |
| 6 | −0.6558 | 1.5993 | −0.0158 | −1.4863 |
| 7 | −0.7495 | 1.6675 | 0.0713 | −1.4928 |
| 8 | −0.4082 | 1.7324 | −0.2343 | −1.4556 |
| 9 | −0.5004 | 1.8108 | −0.1568 | 1.4310 |
| 10 | −0.4577 | 1.9778 | −0.1906 | −1.3615 |
| 11 | −0.2100 | 2.0495 | −0.3611 | −1.2382 |
| 12 | −0.3699 | 2.0737 | −0.2645 | −1.2209 |
| 13 | −0.6184 | 2.3772 | −0.1181 | −1.1629 |
| 14 | −0.4644 | 2.3814 | −0.1935 | −1.1611 |
| 15 | −0.3369 | 2.5374 | −0.2557 | −1.0428 |
| 16 | 0.0438 | 2.5370 | −0.4121 | −1.0390 |
| 17 | 0.6562 | 2.3902 | −0.6629 | −0.8907 |
| 18 | 0.5156 | 2.3117 | −0.6105 | −0.7978 |
| 19 | 0.7979 | 2.2760 | −0.7079 | −0.7661 |
| 20 | −0.4613 | 2.4133 | −0.2841 | −0.6815 |
| 21 | −0.7209 | 2.4512 | −0.2108 | −0.6704 |
| 22 | −0.1766 | 2.4798 | −0.3597 | −0.6121 |
| 23 | −0.0864 | 2.4936 | −0.3819 | −0.5514 |
| 24 | −1.1849 | 2.5443 | −0.1390 | −0.5454 |
| 25 | −1.2447 | 4.0560 | −0.1262 | −0.3922 |
| 26 | −1.0919 | 4.2141 | −0.1410 | −0.3718 |
| 27 | 0.1297 | 4.2110 | −0.2487 | −0.3657 |
| 28 | 0.8776 | 4.0208 | −0.3137 | −0.2978 |
| 29 | 0.2435 | 4.0087 | −0.2667 | −0.2846 |
| 30 | 0.0806 | 3.9188 | −0.2552 | 0.0000 |
| 31 | 0.0806 | 3.9091 | −0.2552 | 0.0308 |
| 32 | 0.4791 | 3.8306 | −0.2520 | 0.0720 |
| 33 | 1.2064 | 3.2717 | −0.2384 | 0.1825 |
| 34 | −0.1894 | 3.2989 | −0.3162 | 0.2278 |
| 35 | −0.1986 | 3.3068 | −0.3168 | 0.2405 |
| 36 | 0.4120 | 3.0700 | −0.2724 | 0.3971 |
| 37 | −0.1705 | 3.0969 | −0.3478 | 0.4519 |
| 38 | 0.7149 | 3.0101 | −0.2186 | 0.4784 |
| 39 | 0.5614 | 2.9101 | −0.2430 | 0.5217 |
| 40 | 1.1260 | 2.7357 | −0.1418 | 0.5436 |
| 41 | 1.3317 | 2.4412 | −0.1009 | 0.5660 |
| 42 | 0.4937 | 2.4233 | −0.2952 | 0.5766 |

Fifth-order coma aberration coefficient (wide-angle end)

| Surface number | II* | IIP | II^ | IIz* | IIz |
|---|---|---|---|---|---|
| 1 | 0.0001 | −0.0060 | −0.0240 | 0.0010 | 0.0300 |
| 2 | 0.1130 | −0.0810 | −0.1110 | 0.0160 | 0.1860 |
| 3 | −0.1720 | −0.1260 | −0.0640 | −0.0200 | −0.1790 |
| 4 | 0.3860 | −0.5220 | −0.8460 | 0.1720 | 0.4750 |
| 5 | 0.0360 | −0.0470 | 0.0220 | 0.1050 | −0.1080 |
| 6 | 0.5010 | −0.2830 | −0.6670 | 0.3610 | 0.2030 |
| 7 | −1.1750 | 0.7960 | 1.6510 | −0.7520 | −0.6060 |
| 8 | −0.0720 | 0.0660 | −0.0340 | 0.1100 | −0.0260 |
| 9 | 0.0640 | −0.0580 | 0.0160 | −0.0860 | 0.0240 |

-continued

Numerical Embodiment 5
Unit: mm

| | | | | | |
|---|---|---|---|---|---|
| 10 | −0.0880 | −0.1140 | −0.2030 | 0.0620 | 0.0750 |
| 11 | −0.0060 | −0.0220 | −0.0050 | −0.0160 | −0.0140 |
| 12 | 0.6220 | −0.5670 | −1.2090 | 0.5050 | 0.3620 |
| 13 | −0.0420 | 0.0590 | 0.0440 | −0.1510 | 0.0060 |
| 14 | −0.0310 | −0.0850 | 0.1300 | −0.0240 | 0.0200 |
| 15 | −0.0380 | 0.5180 | 0.7510 | −0.2110 | −0.3060 |
| 16 | 0.2020 | −0.0900 | 0.0050 | −0.1040 | 0.1390 |
| 17 | −0.0360 | 0.2340 | 0.2590 | −0.1280 | 0.0090 |
| 18 | 0.0390 | −0.0030 | −0.0190 | 0.0660 | −0.0400 |
| 19 | −0.5190 | −3.0410 | −8.4660 | 6.1740 | 1.4330 |
| 20 | 0.4040 | −0.1220 | −0.0260 | 1.3880 | −0.1390 |
| 21 | −5.6110 | 3.6490 | 9.6220 | −8.1520 | −1.9610 |
| 22 | 0.0050 | −0.0610 | −0.0400 | 0.0360 | −0.0650 |
| 23 | 1.1150 | −1.0160 | −1.7380 | 0.8660 | 0.8300 |
| 24 | −2.5480 | 0.9100 | −1.6740 | 2.5500 | −0.4300 |
| 25 | 4.8530 | −1.5070 | 3.4570 | −4.8750 | 0.7190 |
| 26 | −10.1560 | 3.5270 | 8.5510 | −7.9790 | −2.1620 |
| 27 | 2.6780 | −0.5260 | 0.7520 | −2.1100 | 0.4500 |
| 28 | 21.4940 | −6.2710 | −18.6550 | 19.5950 | 3.3740 |
| 29 | −0.0930 | 0.1320 | 0.0660 | 0.1370 | 0.1360 |
| 30 | 0.0000 | 0.0000 | 0.0000 | 0.0000 | 0.0000 |
| 31 | 0.5780 | −0.4000 | −0.1760 | 0.5110 | 0.0360 |
| 32 | −19.1130 | 5.8530 | 24.8520 | −23.7960 | −2.9570 |
| 33 | 1.7710 | −4.8480 | −29.2290 | 29.1110 | 2.3620 |
| 34 | −0.1380 | −0.0006 | −0.1070 | 0.1350 | 0.0001 |
| 35 | 4.6570 | 1.1250 | 2.5830 | −2.8130 | −0.4360 |
| 36 | −5.0130 | −0.8230 | −3.4560 | 5.6490 | 0.3350 |
| 37 | 19.7020 | −0.8290 | 9.7030 | −12.8480 | 0.5360 |
| 38 | −1.4030 | −0.7010 | −1.7300 | 2.5650 | 0.2690 |
| 39 | 13.7200 | −1.1200 | 7.7670 | −5.0390 | 0.6560 |
| 40 | 0.0350 | −0.6510 | −1.2230 | 4.7790 | 0.2750 |
| 41 | −28.1710 | 5.7940 | −5.0650 | −5.6250 | −3.0930 |
| 42 | −2.0740 | 0.5450 | 3.8550 | −0.1360 | −0.2890 |

TABLE 1

Respective conditional expression corresponding values in numerical embodiments 1 to 5

| Conditional expression number | Conditional expression | Numerical embodiment 1 | Numerical embodiment 2 | Numerical embodiment 3 | Numerical embodiment 4 | Numerical embodiment 5 |
|---|---|---|---|---|---|---|
| (1) | $1/\beta 3w$ | −0.399 | 0.080 | −0.143 | −0.125 | −0.065 |
| (2) | Ld41/r411 | −0.043 | −0.036 | −0.079 | −0.117 | −0.176 |
| (3) | Ld41/r412 | −0.039 | −0.028 | −0.068 | −0.121 | −0.242 |
| (4) | r411/r412 | 0.901 | 0.782 | 0.862 | 1.031 | 1.372 |
| (5) | f1/f2 | −1.042 | −1.905 | −1.255 | −1.450 | −1.600 |
| (6) | f2/f3 | −0.441 | −0.301 | −0.379 | −0.357 | −0.397 |
| (7) | $(\theta 42p - \theta 42n)/(v42p - v42n)$ | −1.38E−03 | 1.35E−03 | −1.97E−03 | −1.43E−03 | −1.43E−03 |
| (8) | n42n | 2.003300 | 2.001000 | 1.805181 | 2.003300 | 2.003300 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-091814, filed Apr. 13, 2012, which is hereby incorporated by reference herein in its entirety.

What is claimed is:

1. A zoom lens comprising, in order from an object side to an image side, a first lens unit having positive refractive power that does not move for zooming; a second lens unit having negative refractive power that moves during zooming; a third lens unit having positive refractive power that moves during zooming; and a fourth lens unit having positive refractive power that does not move for zooming, wherein the fourth lens unit includes a 41 lens group and a 42 lens group in order from the object side to the image side across the longest air interval in the fourth lens unit, when the longest air interval in the 41 lens group corresponds to Ld41, the 41 lens group includes a 411 lens group and a 412 lens group in order from the object side to the image side across the longest air interval in the 41 lens group, a lens surface on the most image side of the 411 lens group has a shape convex to the image side and a lens surface on the most object side of the 412 lens group has a shape concave to the object side, and the following conditions are satisfied:

$$-0.7 < 1/\beta 3w < 0.5;$$

$$-0.30 < Ld41/r411 < -0.02;$$

$$-0.30 < Ld41/r412 < -0.02; \text{ and}$$

$$0.5 < r411/r412 < 1.5,$$

where a curvature radius of the lens surface on the most image side of the 411 lens group corresponds to r411, a curvature radius of the lens surface on the most object side of the 412 lens group corresponds to r412, the zoom lens focuses on an infinite object, and lateral magnification of the third lens unit at a wide-angle end corresponds to β3w.

2. The zoom lens according to claim 1, wherein the following conditions are satisfied:

$$-2.20 < f1/f2 < -1.00; \text{ and}$$

$$-0.50 < f2/f3 < -0.25,$$

where focal length of the first lens unit corresponds to f1, focal length of the second lens unit corresponds to f2, and focal length of the third lens unit corresponds to f3.

3. The zoom lens according to claim 1, wherein
the 42 lens group includes one or more positive lenses and one or more negative lenses, and
the following condition is satisfied:

$$-2.5 \times 10^{-3} < (\theta 42p - \theta 42n)/(\nu 42p - \nu 42n) < -1.0 \times 10^{-3},$$

where an average value of Abbe constants of materials of the one or more positive lenses of the 42 lens group corresponds to ν42p, an average value of partial dispersion ratios of materials of the one or more positive lenses of the 42 lens group corresponds to θ42p, an average value of Abbe constants of materials of the one or more negative lenses of the 42 lens group corresponds to ν42n, and an average value of partial dispersion ratios of materials of the one or more negative lenses of the 42 lens group corresponds to θ42n.

4. The zoom lens according to claim 1, wherein the following condition is satisfied:

$$1.75 < n42n < 2.20,$$

where an average value of refractive indexes of materials of the one or more negative lenses of the 42 lens group corresponds to n42n.

5. The zoom lens according to claim 1, wherein
the 411 lens group includes one positive lens, and
the 412 lens group includes a cemented lens formed by joining a positive lens and a negative lens in order from the object side to the image side.

6. The zoom lens according to claim 1, wherein
the 411 lens group includes two positive lenses, and
the 412 lens group includes a cemented lens formed by joining a positive lens and a negative lens in order from the object side to the image side.

7. The zoom lens according to claim 1, wherein the 42 lens group includes, in order from the object side to the image side, a positive lens and a cemented lens formed by joining a positive lens and a negative lens.

8. The zoom lens according to claim 1, wherein the 42 lens group includes, in order from the object side to the image side, a positive lens, a cemented lens formed by joining a positive lens and a negative lens and a positive lens.

9. The zoom lens according to claim 1, wherein the 42 lens group includes, in order from the object side to the image side, a positive lens, a positive lens and a cemented lens formed by joining a positive lens and a negative lens.

10. An image pickup apparatus comprising:
a zoom lens including, in order from an object side to an image side, a first lens unit having positive refractive power that does not move for zooming; a second lens unit having negative refractive power that moves during zooming; a third lens unit having positive refractive power that moves during zooming; and a fourth lens unit having positive refractive power that does not move for zooming,
the fourth lens unit includes a 41 lens group and a 42 lens group in order from the object side to the image side across the longest air interval in the fourth lens unit, when the longest air interval in the 41 lens group corresponds to Ld41, the 41 lens group including a 411 lens group and a 412 lens group in order from the object side to the image side across the longest air interval in the 41 lens group,
a lens surface on the most image side of the 411 lens group has a shape convex to the image side and a lens surface on the most object side of the 412 lens group has a shape concave to the object side, and
the following conditions are satisfied:

$$-0.7 < 1/\beta 3w < 0.5;$$

$$-0.30 < Ld41/r411 < -0.02;$$

$$-0.30 < Ld41/r412 < -0.02; \text{ and}$$

$$0.5 < r411/r412 < 1.5,$$

where a curvature radius of the lens surface on the most image side of the 411 lens group corresponds to r411, a curvature radius of the lens surface on the most object side of the 412 lens group corresponds to r412, the zoom lens focuses on an infinite object, and lateral magnification of the third lens unit at a wide-angle end corresponds to β3w, and
a solid-state image pickup device configured to receive an image formed by the zoom lens.

* * * * *